United States Patent
Kovacs et al.

(10) Patent No.: US 11,710,276 B1
(45) Date of Patent: Jul. 25, 2023

(54) METHOD AND DEVICE FOR IMPROVED MOTION PLANNING

(71) Applicant: Apple Inc., Cupertino, CA (US)

(72) Inventors: Daniel Laszlo Kovacs, Santa Clara, CA (US); Siva Chandra Mouli Sivapurapu, Santa Clara, CA (US); Payal Jotwani, Santa Clara, CA (US); Noah Jonathan Gamboa, Rancho Santa Fe, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/358,876

(22) Filed: Jun. 25, 2021

Related U.S. Application Data

(60) Provisional application No. 63/080,915, filed on Sep. 21, 2020.

(51) Int. Cl.
*G06T 17/00* (2006.01)
*G06N 3/00* (2006.01)
*G06T 19/00* (2011.01)

(52) U.S. Cl.
CPC .................... *G06T 19/003* (2013.01)

(58) Field of Classification Search
CPC ............... G06N 3/006; G06T 19/003
See application file for complete search history.

(56) References Cited

U.S. PATENT DOCUMENTS

| | | | | |
|---|---|---|---|---|
| 10,671,076 B1 * | 6/2020 | Kobilarov | ............... | G08G 1/166 |
| 11,423,300 B1 * | 8/2022 | Ritter | ..................... | G06N 3/047 |
| 11,430,181 B1 * | 8/2022 | Jotwani | ..................... | G06T 17/20 |
| 11,460,580 B2 * | 10/2022 | Schroeter | ............... | G01C 21/16 |
| 11,462,034 B2 * | 10/2022 | van den Oord | ........ | H04N 19/50 |
| 2019/0244099 A1 * | 8/2019 | Schaul | ....................... | G06N 3/08 |
| 2019/0332922 A1 * | 10/2019 | Nachum | ................ | G06N 3/006 |
| 2020/0097015 A1 * | 3/2020 | Keselman | ........... | G06F 16/2246 |
| 2020/0104685 A1 * | 4/2020 | Hasenclever | .......... | G06N 3/045 |
| 2020/0143206 A1 * | 5/2020 | Kartal | ....................... | G06N 5/01 |

(Continued)

FOREIGN PATENT DOCUMENTS

| | | | | |
|---|---|---|---|---|
| WO | WO 2021/152515 | * | 8/2021 | ............... G06N 3/00 |

OTHER PUBLICATIONS

Sud et al., Real-time Path Planning for Virtual Agents in Dynamic Environments, 2008 (Year: 2008).*

(Continued)

*Primary Examiner* — Phong X Nguyen
(74) *Attorney, Agent, or Firm* — Fernando & Partners, LLP

(57) ABSTRACT

In one implementation, a method for improved motion planning. The method includes: obtaining a macro task for a virtual agent within a virtual environment; generating a search-tree based on at least one of the macro task, a state of the virtual environment, and a state of the virtual agent, wherein the search-tree includes a plurality of task nodes corresponding to potential tasks for performance by the virtual agent in furtherance of the macro task; and determining physical motion plans (PMPs) for at least some of the plurality of task nodes within the search-tree in order to generate a lookahead planning gradient for the first time, wherein a granularity of a PMP for a respective task node in the first search-tree is a function of the temporal distance of the respective task node from the first time.

23 Claims, 18 Drawing Sheets

(56) References Cited

U.S. PATENT DOCUMENTS

| | | | | |
|---|---|---|---|---|
| 2020/0143239 | A1* | 5/2020 | Simonyan | G06N 3/006 |
| 2020/0206920 | A1* | 7/2020 | Ma | G06F 18/23213 |
| 2020/0387158 | A1* | 12/2020 | Kobilarov | G05D 1/0055 |
| 2021/0104090 | A1* | 4/2021 | Hur | H04N 19/597 |
| 2021/0253128 | A1* | 8/2021 | Nister | G06N 3/08 |
| 2021/0311778 | A1* | 10/2021 | Li | G06N 5/01 |
| 2021/0312242 | A1* | 10/2021 | Jafarkhani | G06N 3/08 |
| 2021/0383228 | A1* | 12/2021 | Velickovic | G06F 16/2379 |
| 2022/0187841 | A1* | 6/2022 | Ebrahimi Afrouzi | G05D 1/0242 |
| 2022/0215326 | A1* | 7/2022 | Bever | G06F 21/6218 |
| 2022/0295317 | A1* | 9/2022 | Challita | H04W 28/18 |
| 2022/0355483 | A1* | 11/2022 | Lee | B25J 9/1666 |
| 2022/0366247 | A1* | 11/2022 | Hamrick | G06N 3/04 |
| 2022/0383740 | A1* | 12/2022 | Hellgren | G05D 1/0297 |

OTHER PUBLICATIONS

Pascanu et al., Learning model-based planning from scratch, 2017 (Year: 2017).*
Quan et al., Survey of UAV motion planning, 2020 (Year: 2020).*
Efficient Planning under Uncertainty with Macro-actions, He et al., 2011 (Year: 2011).*

* cited by examiner

METHOD AND DEVICE FOR IMPROVED MOTION PLANNING

CROSS-REFERENCE TO RELATED APPLICATIONS

This application claims the benefit of U.S. Provisional Patent App. No. 63/080,915, filed on Sep. 21, 2020, which is incorporated by reference in its entirety.

TECHNICAL FIELD

The present disclosure generally relates to motion planning and, in particular, to systems, methods, and methods for improved motion planning based on a lookahead planning gradient.

BACKGROUND

In some instances, motion planning for a virtual agent is a resource intensive exercise. Furthermore, from a resource consumption standpoint, performing motion planning for potential tasks becomes more speculative and computationally wasteful the further into the future the planning horizon becomes.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
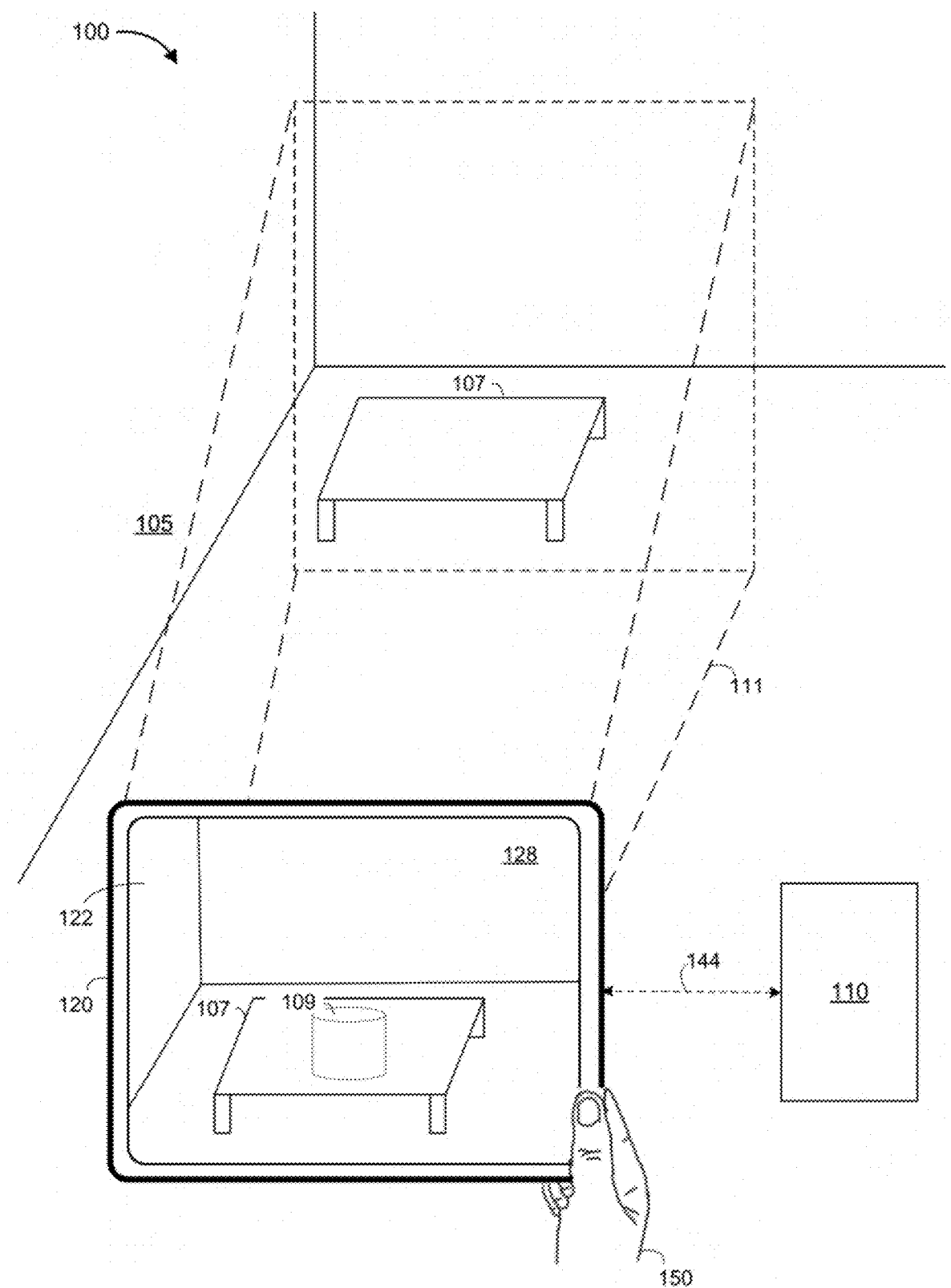
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods of improved motion planning. According to some implementations, the method is performed at a virtual agent operating system including one or more processors and non-transitory memory. In some implementations, the virtual agent operating system is communicatively coupled to a display device and one or more input devices. The method includes: obtaining a first macro task for a virtual agent within a virtual environment; generating, at a first time, a first search-tree based on at least one of the first macro task, a state of the virtual environment at the first time, and a state of the virtual agent at the first time, wherein the first search-tree includes a first plurality of task nodes corresponding to potential tasks for performance by the virtual agent in furtherance of the first macro task; and determining physical motion plans (PMPs) for at least some of the first plurality of task nodes within the first search-tree in order to generate a first lookahead planning gradient for the first time, wherein a granularity of a PMP for a respective task node in the first search-tree is a function of the temporal distance of the respective task node from the first time.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, ahead mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an XR experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3. For example, the electronic device 120 corresponds to a mobile phone, tablet, laptop, wearable computing device, or the like.

According to some implementations, the electronic device 120 presents an XR experience to the user 150 while the user 150 is physically present within a physical environment 105 that includes a table 107 within the field-of-view 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107) on a display 122. For example, the XR environment 128, including the XR cylinder 109, is volumetric or three-dimensional (3D).

In one example, the XR cylinder 109 corresponds to display-locked content such that the XR cylinder 109 remains displayed at the same location on the display 122 as the FOV 111 changes due to translational and/or rotational movement of the electronic device 120. As another example, the XR cylinder 109 corresponds to world-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109.

In some implementations, the display 122 corresponds to an additive display that enables optical see-through of the physical environment 105 including the table 107. For example, the display 122 correspond to a transparent lens, and the electronic device 120 corresponds to a pair of glasses worn by the user 150. As such, in some implementations, the electronic device 120 presents a user interface by projecting the XR content (sometimes also referred to herein as "graphical content" or "virtual content"), including an XR cylinder 109, onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the field-of-view of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
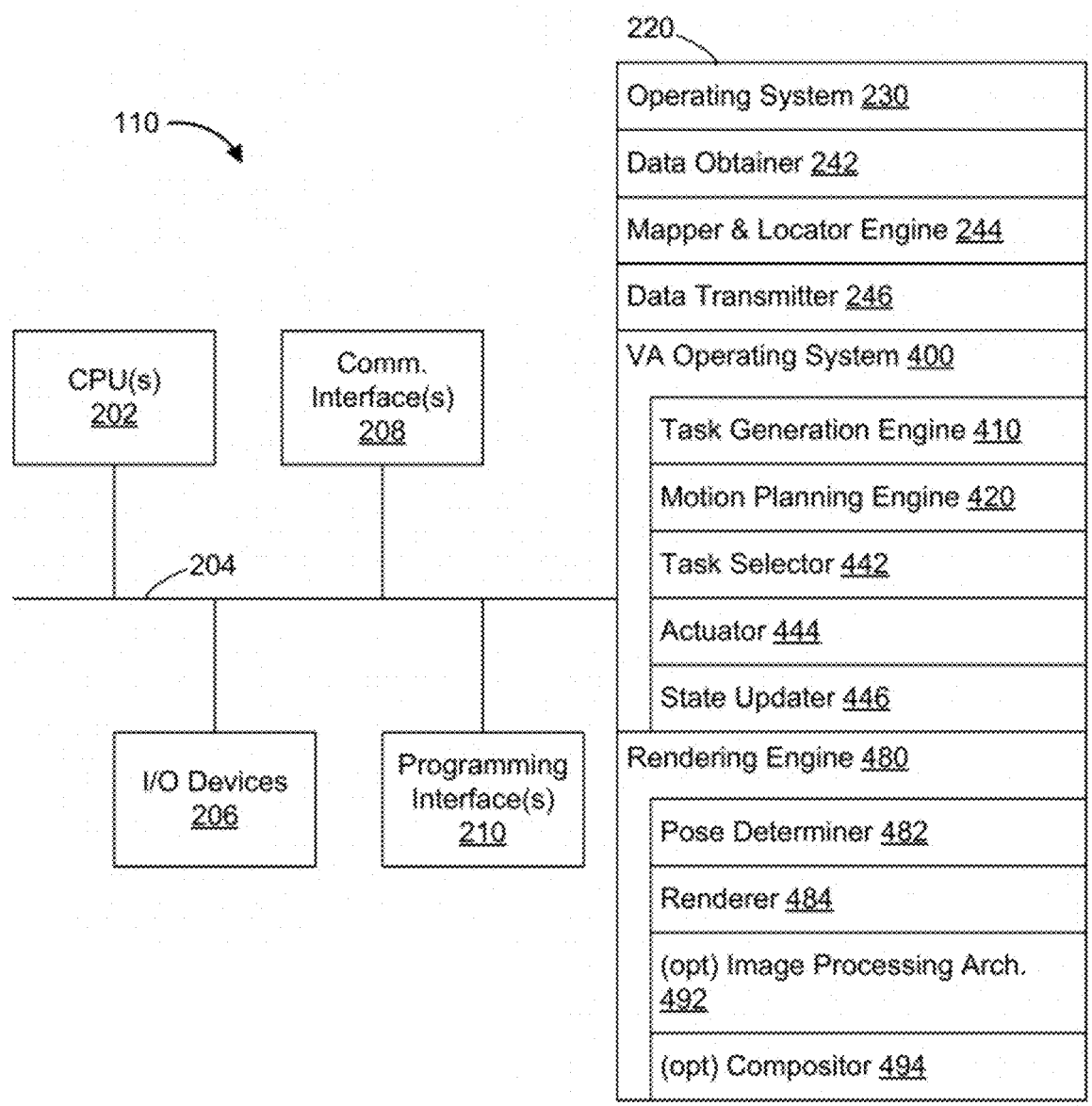
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touch-screen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

The operating system 230 includes procedures for handling various system services and for performing hardware dependent tasks.

In some implementations, the data obtainer 242 is configured to obtain data (e.g., captured image frames of the physical environment 105, presentation data, input data, user interaction data, camera pose tracking information, eye tracking information, head/body pose tracking information, hand/limb tracking information, sensor data, location data, etc.) from at least one of the I/O devices 206 of the controller 110, the I/O devices and sensor 306 of the electronic device 120, and the optional remote input devices. To that end, in various implementations, the data obtainer 242 includes instructions and/or logic therefor, and heuristics and metadata therefor.

In some implementations, the mapper and locator engine 244 is configured to map the physical environment 105 and to track the position/location of at least the electronic device 120 or the user 150 with respect to the physical environment 105. To that end, in various implementations, the mapper and locator engine 244 includes instructions and/or logic therefor, and heuristics and metadata therefor.

In some implementations, the data transmitter 246 is configured to transmit data (e.g., presentation data such as rendered image frames associated with the XR environment, location data, etc.) to at least the electronic device 120. To that end, in various implementations, the data transmitter 246 includes instructions and/or logic therefor, and heuristics and metadata therefor.

In some implementations, a virtual agent (VA) operating system 400 is configured to manage, coordinate, drive, control, etc. one or more VAs within a virtual environment. For example, the one or more VAs correspond to humanoids, animals, vehicles, objects, robots, androids, anthropomorphic entities, and/or the like. For example, the virtual environment corresponds to a partially or fully virtual environment. The VA operating system 400 is described in more detail below with reference to FIG. 4A. To that end, in various implementations, the VA operating system 400 includes instructions and/or logic therefor, and heuristics and metadata therefor. In some implementations, the VA operating system 400 includes a task generation engine 410, a motion planning engine 420, a task selector 422, an actuator 444, and a state updater 446.

In some implementations, the task generation engine 410 is configured to generate a search-tree for a current time period based on: (a) a macro task, (b) a VA profile, and (c) state information for the current time period associated with the virtual agent and the virtual environment. In some implementations, the task generation engine 410 is also configured to update the search-tree for a subsequent time period based on updated state information associated with the VA and the virtual environment after selection and performance of a task for the previous time period. As such, the task generation engine 410 recycles, reuses, etc. some portion(s) of the search-tree from the previous time period for the subsequent time period. The task generation engine 410 is described in more detail below with reference to FIG. 4A. To that end, in various implementations, the task generation engine 410 includes instructions and/or logic therefor, and heuristics and metadata therefor.

Figure 5:
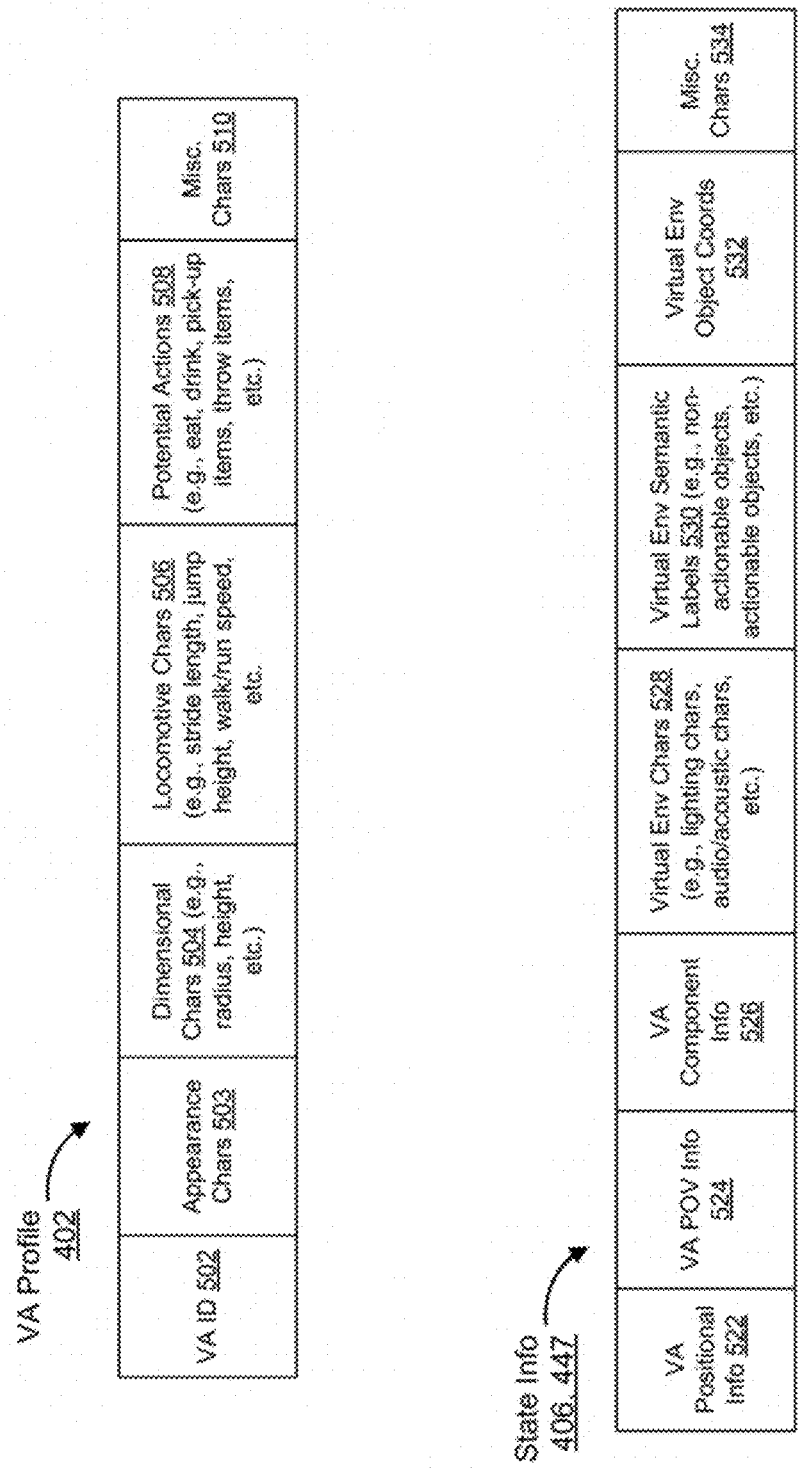
FIG. 5 is an illustration of example data structures for a VA profile and state information in accordance with some implementations.

FIG. 5, described in detail below, shows an example data structure for a VA profile 402. FIG. 5, described in detail below, shows an example data structure for the current state information 406, 447 including the current state information for the VA and the current state information for the virtual environment.

In some implementations, the motion planning engine 420 is configured to generate a lookahead planning gradient based on the search-tree generated by the task generation engine 410 for the current time period. In some implementations, the motion planning engine 420 is also configured to update the lookahead planning gradient for a subsequent time period based on updated state information associated with the virtual agent and the virtual environment after selection and performance of a task for the previous time period. In some implementations, the motion planning engine 420 recycles, reuses, etc. some portion(s) of the lookahead planning gradient from the previous time period for the subsequent time period. The motion planning engine 420 is described in more detail below with reference to FIG. 4A. To that end, in various implementations, the motion planning engine 420 includes instructions and/or logic therefor, and heuristics and metadata therefor.

For example, the lookahead planning gradient includes physical motion plans (PMPs) for at least some of the task nodes within the search-tree for the current time period. One of ordinary skill in the art will appreciate that a PMP may include joint positions, physics information, etc. in order to cause a VA to locomote, carry out an action, and/or the like. In some implementations, the granularity/complexity of a PMP for a respective task node in the search-tree is a function of the temporal distance of the respective task node from the current time period. For example, the granularity of the PMPs corresponds to full resolution, medium/partial resolution, or low/zero resolution PMP. Put another way, the amount of computational resources devoted to developing the PMP for a subject task node varies based on the temporal distance of the subject task node relative to the current root task node.

In some implementations, the task selector 442 is configured to select a task node (associated with a specific task for the current time period) from the search-tree for the current time period. The task selector 442 is described in more detail below with reference to FIG. 4A. To that end, in various implementations, the task selector 442 is includes instructions and/or logic therefor, and heuristics and metadata therefor.

In some implementations, the actuator 444 is configured to actuate the VA within the virtual environment based on the PMP from the lookahead planning gradient associated with the task node selected by the task selector 442 for the current time period in order to carry out the associated task selected or perform actions (e.g., walking, etc.) in furtherance of the associated task. The actuator 444 is described in more detail below with reference to FIG. 4A. To that end, in various implementations, the actuator 444 is includes instructions and/or logic therefor, and heuristics and metadata therefor.

In some implementations, the state updater 446 is configured to update the state information (e.g., associated with the VA and the virtual environment) from the previous time period based on the task performed by the VA and/or the actions performed by the VA in furtherance of the task. The state updater 446 is described in more detail below with reference to FIG. 4A. To that end, in various implementations, the state updater 446 is includes instructions and/or logic therefor, and heuristics and metadata therefor.

In some implementations, a rendering engine 480 is configured to render a XR environment (sometimes also referred to herein as a "graphical environment" or "virtual environment") or image frame(s) associated therewith, including the VA. To that end, in various implementations, the rendering engine 480 includes instructions and/or logic therefor, and heuristics and metadata therefor. In some implementations, the rendering engine 480 includes a pose determiner 482, a renderer 484, an optional image processing architecture 492, and an optional compositor 494.

In some implementations, the pose determiner 482 is configured to determine a current camera pose of the electronic device 120 and/or the user 150 relative to the VA and/or the XR environment. The pose determiner 482 is described in more detail below with reference to FIG. 4B. To that end, in various implementations, the pose determiner 482 includes instructions and/or logic therefor, and heuristics and metadata therefor.

In some implementations, the renderer 484 is configured to render the VA and/or the XR content (sometimes also referred to herein as "graphical content" or "virtual content") according to the current camera pose relative thereto. The renderer 484 is described in more detail below with reference to FIG. 4B. To that end, in various implementations, the renderer 484 includes instructions and/or logic therefor, and heuristics and metadata therefor.

In some implementations, the optional image processing architecture 492 is configured to obtain (e.g., receive, retrieve, or capture) an image stream including one or more images of the physical environment 105 from the current camera pose of the electronic device 120 and/or the user 150. In some implementations, the image processing architecture 492 is also configured to perform one or more image processing operations on the image stream such as warping, color correction, gamma correction, sharpening, noise reduction, white balance, and/or the like. The image processing architecture 492 is described in more detail below with reference to FIG. 4B. To that end, in various implementations, the image processing architecture 492 includes instructions and/or logic therefor, and heuristics and metadata therefor.

In some implementations, the optional compositor 494 is configured to composite the rendered VA and/or XR content with the processed image stream of the physical environment 105 from the image processing architecture 492 to produce rendered image frames of the XR environment for display. The compositor 494 is described in more detail below with reference to FIG. 4B. To that end, in various implementations, the compositor 494 includes instructions and/or logic therefor, and heuristics and metadata therefor. One of ordinary skill in the art will appreciate that the optional image processing architecture 492 and the optional compositor 494 may not be applicable for fully virtual environments.

Although the data obtainer 242, the mapper and locator engine 244, the data transmitter 246, the VA operating system 400, and the rendering engine 480 are shown as residing on a single device (e.g., the controller 110), it should be understood that in other implementations, any combination of the data obtainer 242, the mapper and locator engine 244, the data transmitter 246, the VA operating system 400, and the rendering engine 480 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
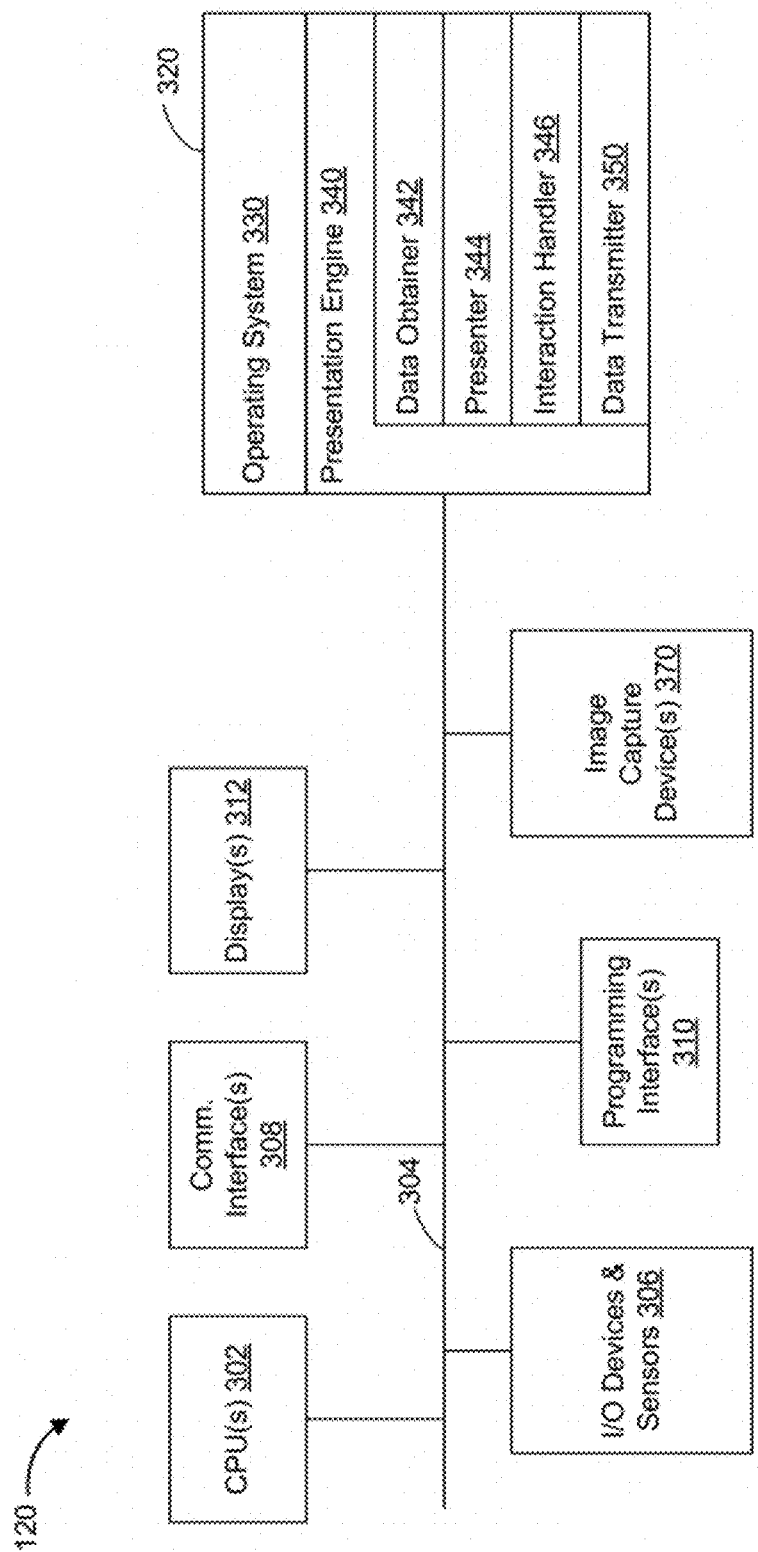
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb tracking engine, a camera pose tracking engine, or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various system services and for performing hardware dependent tasks. In some implementations, the presentation engine 340 is configured to present media items and/or XR content to the user via the one or more displays 312. To that end, in various implementations, the presentation engine 340 includes a data obtainer 342, a presenter 344, an interaction handler 346, and a data transmitter 350.

In some implementations, the data obtainer 342 is configured to obtain data (e.g., presentation data such as rendered image frames associated with the user interface/XR environment, input data, user interaction data, head tracking information, camera pose tracking information, eye tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the presenter 344 is configured to present and update A/V content and/or XR content (e.g., the rendered image frames associated with the user interface or the XR environment) via the one or more displays 312. To that end, in various implementations, the presenter 344 includes instructions and/or logic therefor, and heuristics and metadata therefor.

In some implementations, the interaction handler 346 is configured to detect user requests/inputs and/or user interactions with the presented A/V content and/or XR content (e.g., gestural inputs detected via hand tracking, eye gaze inputs detected via eye tracking, voice commands, etc.). To that end, in various implementations, the interaction handler 346 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, etc.) to at least the controller 110. To that end, in various implementations, the data transmitter 350 includes instructions and/or logic therefor, and heuristics and metadata therefor.

Although the data obtainer 342, the presenter 344, the interaction handler 346, and the data transmitter 350 are shown as residing on a single device (e.g., the electronic device 120), it should be understood that in other implementations, any combination of the data obtainer 342, the presenter 344, the interaction handler 346, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
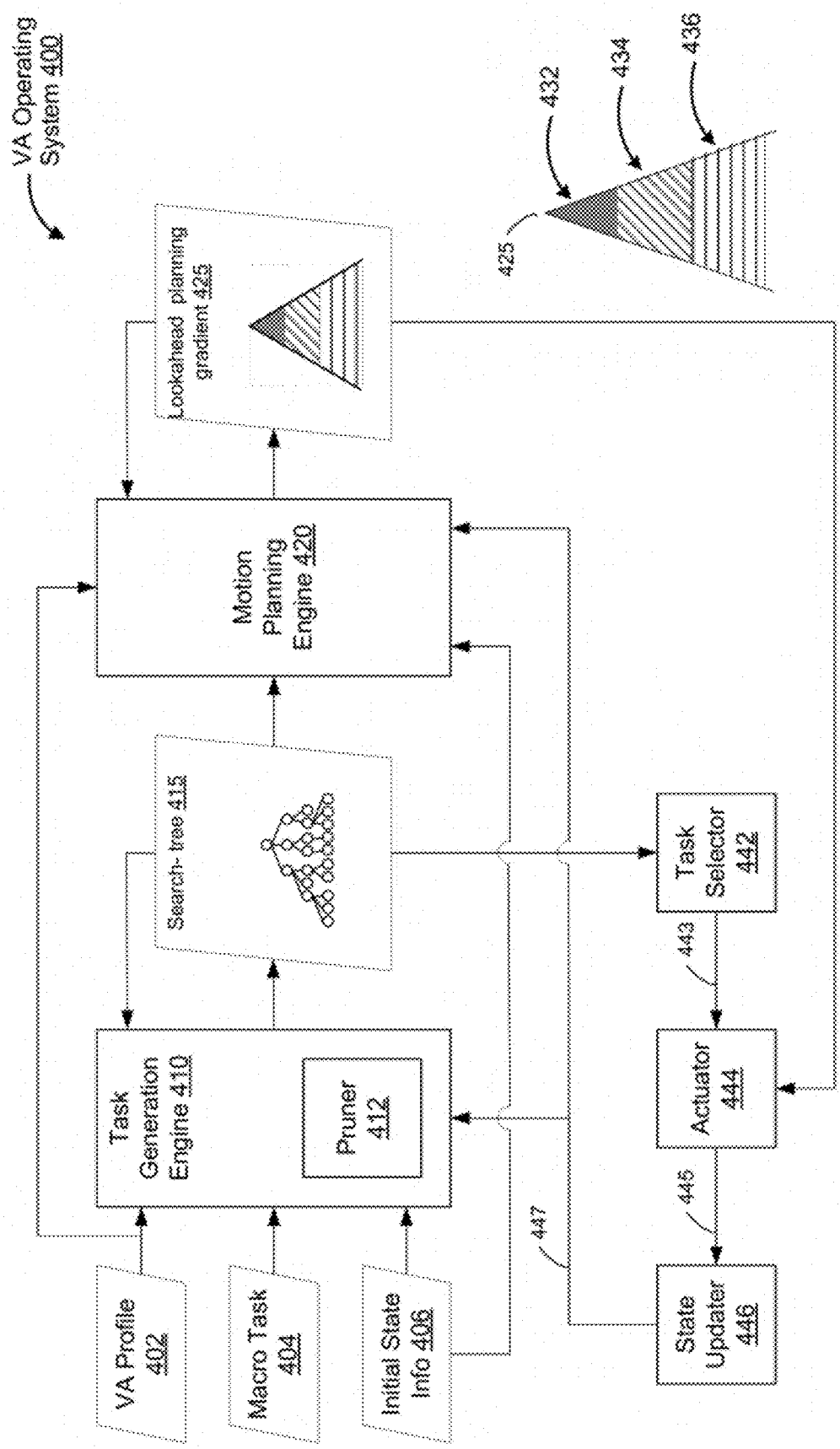
FIG. 4A is a block diagram of an example virtual agent (VA) operating system in accordance with some implementations.

FIG. 4A is a block diagram of an example VA operating system 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the VA operating system 400 is included in a computing system such as the controller 110 shown in FIGS. 1 and 2; the electronic device 120 shown in FIGS. 1 and 3; and/or a suitable combination thereof.

Figure 7:
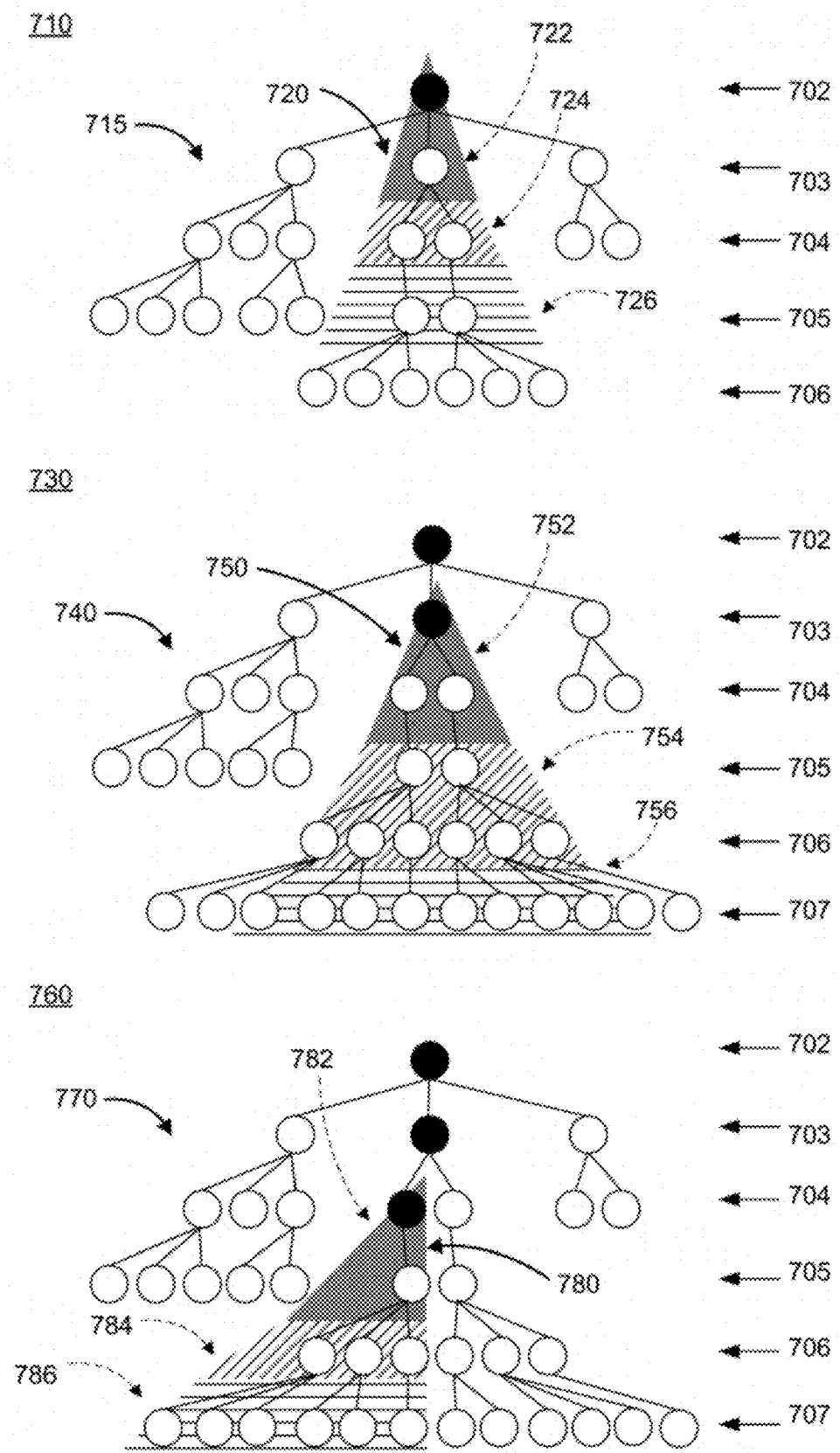
FIG. 7 illustrates an example evolution of a search-tree and associated lookahead planning gradients in accordance with some implementations.

As shown in FIG. 4A, the task generation engine 410 generates a search-tree 415 for the current time period based on: (a) the VA profile 402, (b) the macro task 404, and (c) the initial state information 406. As shown in FIG. 4A, the search-tree 415 is fed back to the task generation engine 410 so that the task generation engine 410 may recycle, reuse, etc. some portion(s) of the search-tree 415 for a subsequent time period. For example, the search-tree 415 includes a plurality of tasks in furtherance of the macro task 404. For example, the plurality of tasks in the search-tree 415 include: immediate task(s) that are temporally close to the current time period, intermediate task(s) that are temporally further away from the current time period, and distant task(s) that are temporally distant from to the current time period. For example, immediate task(s) may be the most detailed and the intermediate task(s) and the distant task(s) may be less detailed (e.g., more abstract). For example, the intermediate task(s) and the distant task(s) may reference separate plans, conditional-plans, behaviors, policies for selecting granular actions, and/or the like. FIG. 7, for example, shows an example evolution of a search-tree and associated lookahead planning gradients over time.

In some implementations, the pruner 412 prunes the search-tree 415 to remove task nodes associated with high entropy tasks, unlikely or improbable tasks, and/or the like. In some implementations, the pruner 412 prunes the search-tree 415 to also remove task nodes associated with tasks that cannot be performed by the VA, actions that are not possible based on the current state of the virtual environment, and/or the like.

In some implementations, the VA operating system 400 or a component thereof detects a user input (e.g., a voice command, gestural input, selection from a user interface (UI) menu of VAs, etc.) associated with the selection of the VA. Subsequently, in some implementations, the VA operating system 400 or a component thereof obtains the VA profile 402 associated with the selected VA from a bank of VA profiles and instantiates the selected VA within the virtual environment. As such, for example, the VA profile 402 corresponds to the particular VA that has been instantiated with the virtual environment. For example, the VA corresponds to a humanoid, animal, vehicle, object, robot, android, anthropomorphic entity, or the like.

As shown in FIG. 5, the VA profile 402 includes a VA identifier (ID) 502 for the VA, appearance characteristics 503 for the VA (e.g., color, texture, outfit, shape, etc.), dimensional characteristics 504 for the VA (e.g., radius, height, size, etc.), locomotive characteristics 506 for the VA (e.g., stride/step/gait length, stride type/style, jump height, walk/run speed, swim speed, etc.), a set of potential actions 508 for the VA (e.g., eat, drink, pick-up items, throw items, walk/run, swim, jump, dialogue engagement, monologue engagement, etc.), and other miscellaneous characteristics 510 for the VA. For example, the VA profile 402 corresponds to a characterization vector, a characterization tensor, or the like. One of ordinary skill in the art will appreciate that the VA profile 402 shown in FIG. 5 is merely an example data structure that may be changed and/or adapted in various other implementations (e.g., with portions added, with portions removed, with a different format/structure, and/or the like).

In some implementations, the macro task 404 is randomly or pseudo-randomly selected from a bank of tasks by the VA operating system 400. In some implementations, the VA operating system 400 or a component thereof detects a user input (e.g., a voice command, gestural input, selection from a UI menu of tasks, etc.) associated with the selection of the macro task 404. For example, the macro task 404 corresponds to a goal, objective, or the like for the VA to complete or accomplish within the virtual environment such as locate and eat a block of cheese, eat lunch with friends, pick-up dry cleaning, clean the bathroom, and/or the like. In some implementations, the macro task 404 may be accompanied with a time constraint (e.g., accomplish within 10 minutes or abort), formality constraints (e.g., wear a suit while performing the task), and/or other constraints (e.g., user provided, crowd-sourced, task-specific, etc. constraints).

In some implementations, the initial state information 406 includes the state of the VA and state of the virtual environment for the current time period. As shown in FIG. 5, for the current time period, the initial state information 406 includes VA positional information 522 (e.g., translational coordinates for the VA with respect to the virtual environment and/or the physical environment, etc.), VA point-of-view (POV) information 524 (e.g., rotational values for the head pose and/or eye gaze of VA, etc.), VA component information 526 (e.g., position/torque/stress information for actuatable/moveable elements of the VA such as joints, feet, wheels, tracks, rudders, sails, airfoils, etc.; status/state information for sensor/equipment associated with the VA such as RPM for vehicles and aircraft, tire pressure for vehicles, etc.; pitch, roll, and yaw for vehicles and aircraft; and/or the like), virtual environment characteristics 528 (e.g., lighting characteristics for the virtual environment, audio/acoustic characteristics, and/or the like), virtual environment semantic labels 530 (e.g., semantic labels for objects/items within the virtual environment, labels for actionable objects/items that the VA may interact with, labels for non-actionable objects/items that the VA may not interact with, and/or the like), virtual environment object coordinates 532 (e.g., translational and/or rotational coordinates for objects/items within the virtual environment and/or the like), and/or other miscellaneous characteristics 534 associated with the state of the VA and/or the virtual environment for the current time period.

For example, the initial state information 406 corresponds to a characterization vector, a characterization tensor, or the like. One of ordinary skill in the art will appreciate that the initial state information 406 shown in FIG. 5 is merely an example data structure that may be changed and/or adapted in various other implementations (e.g., with portions added, with portions removed, with a different format/structure, and/or the like).

As shown in FIG. 4A, the motion planning engine 420 generates a lookahead planning gradient 425 based on the search-tree 415 generated by the task generation engine 410 for the current time period and the initial state information 406. As shown in FIG. 4A, the lookahead planning gradient 425 is fed back to the motion planning engine 420 so that the motion planning engine 420 may recycle, reuse, etc. some portion(s) of the lookahead planning gradient 425 for a subsequent time period. For example, the lookahead planning gradient 425 includes PMPs for at least some of the task nodes in the search-tree 415. In some implementations, the granularity, complexity, resolution, etc. of a PMP for a respective task node in the search-tree 415 is a function of the temporal distance of the respective task node from the current time period. Put another way, the amount of computational resources devoted to developing the PMP for a subject task node varies based on the temporal distance of the subject task node relative to the current root task node.

As such, in FIG. 4A, a first portion 432 of the lookahead planning gradient 425 corresponds to high resolution/complexity PMP for immediate tasks within the search-tree 415. In FIG. 4A, a second portion 434 of the lookahead planning gradient 425 corresponds to medium resolution/complexity PMP for intermediate tasks within the search-tree 415. And a third portion 436 of the lookahead planning gradient 425 corresponds to low resolution/complexity PMP for distant tasks within the search-tree 415.

As shown in FIG. 4A, the task selector 442 selects a task node within the search-tree 415 for the current time period based at least in part on the macro task 404. In some implementations, the task selector 442 divides the task associated with the selected task node into one or more actions 443 in order to carry out the task.

As shown in FIG. 4A, the actuator 444 actuates the VA within the virtual environment based on the PMP from the lookahead planning gradient 425 that corresponds to the selected task node. As such, the actuator 444 causes the VA to perform the one or more actions 443 (e.g., walking, etc.) in in order to carry out the task associated with the selected task node.

As shown in FIG. 4A, the state updater 446 generates updated state information 447 for the VA and the virtual environment based on the one or more actions 443 performed by the VA and causal information 445 associated with the effects of the one or more actions 443 on the VA and the virtual environment. For example, the causal information 445 corresponds to changes to the VA and/or the virtual environment based on the one or more actions 443 such as new positional information for the VA, new positional and/or rotational information for the actuatable elements of the VA, new positional and/or rotational information for the objects/items within the virtual environment, and/or the like.

For a subsequent time period, with reference to FIG. 4A, the task generation engine 410 generates an updated search-tree for the subsequent time period based on the search-tree 415 for the previous time period, the updated state information 447 for the VA and the virtual environment, the macro task 404, and the VA profile 402. Furthermore, with continued reference to FIG. 4A, the motion planning engine 420 generates an updated lookahead planning gradient for the subsequent time period based on updated search-tree, the lookahead planning gradient 425 for the previous time period, and the updated state information 447 for the VA and the virtual environment. One of ordinary skill in the art will appreciate that the VA operating system 400 continues the above-described process until the VA completes and/or accomplishes the macro task 404.

Figure 4B:
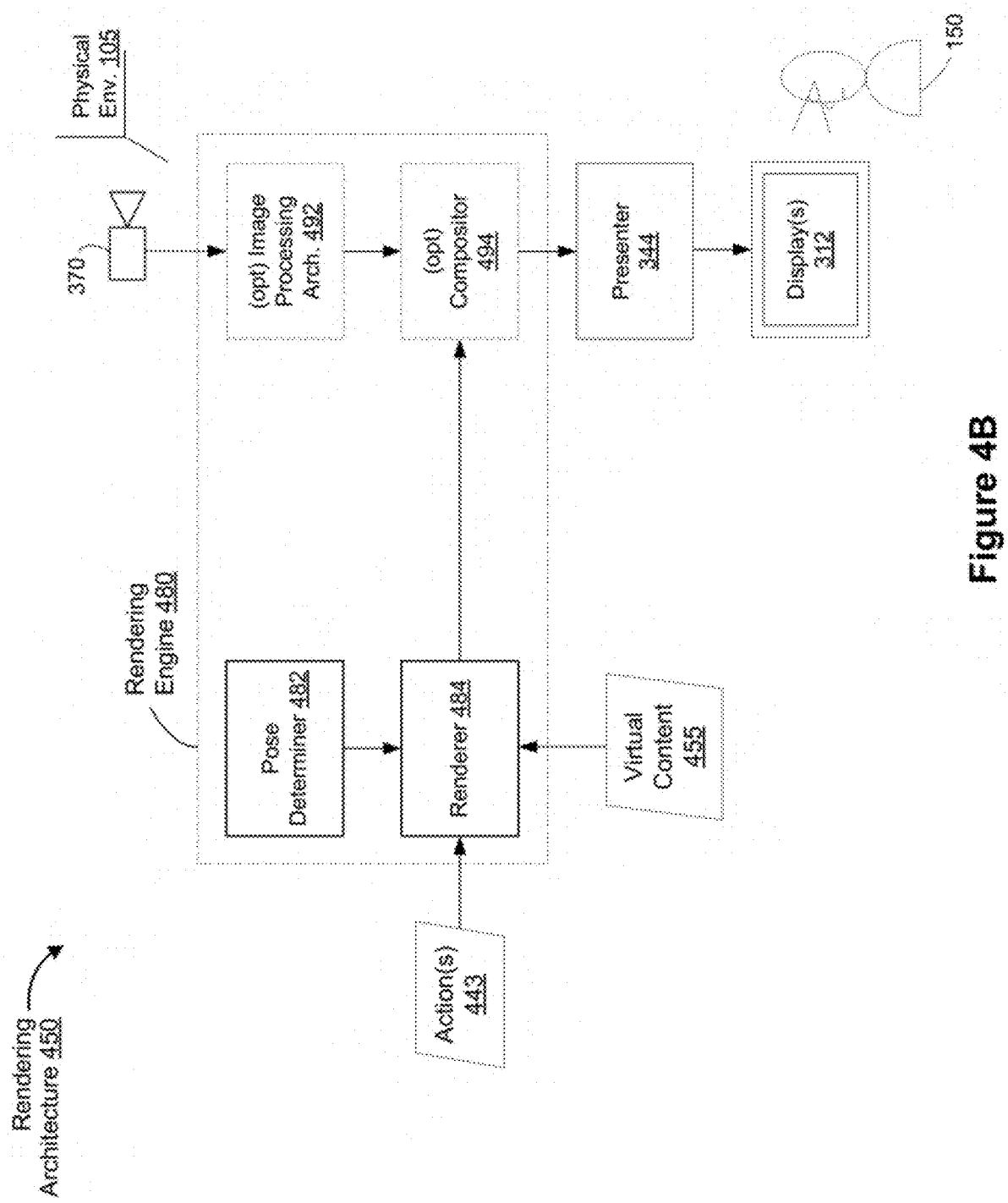
FIG. 4B is a block diagram of an example rendering architecture in accordance with some implementations.

FIG. 4B is a block diagram of a rendering architecture 450 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. The components in FIG. 4B is similar to and adapted from the components in FIG. 4A. As such, similar reference numbers are used herein and only the differences will be described for the sake of brevity. To that end, as a non-limiting example, the rendering architecture 450 is included in a computing system such as the controller 110 shown in FIGS. 1 and 2; the electronic device 120 shown in FIGS. 1 and 3; and/or a suitable combination thereof.

According to some implementations, as shown in FIG. 4B, the pose determiner 482 determines a current camera pose of the electronic device 120 and/or the user 150 relative to the VA and the associated XR content 455. In some implementations, the renderer 484 renders the VA performing the one or more actions 443 within the virtual environment and the associated XR content 455 according to the current camera pose relative thereto.

According to some implementations, as shown in FIG. 4B, the image processing architecture 492 obtains an image stream from an image capture device 370 including one or more images of the physical environment 105 from the current camera pose of the electronic device 120 and/or the user 150. In some implementations, the image processing architecture 492 also performs one or more image processing operations on the image stream such as warping, color correction, gamma correction, sharpening, noise reduction, white balance, and/or the like. In some implementations, the compositor 494 composites the rendered VA and the XR content 455 with the processed image stream of the physical environment 105 from the image processing architecture 492 to produce rendered image frames of the XR environment. In various implementations, the presenter 344 presents the rendered image frames of the XR environment to the user 150 via the one or more displays 312. One of ordinary skill in the art will appreciate that the optional image processing architecture 492 and the optional compositor 494 may not be applicable for fully virtual environments.

FIGS. 6A-6G illustrate a sequence of instances 610, 620, 630, 640, 650, 660, and 670 for an example virtual agent (VA) runtime scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 610, 620, 630, 640, 650, 660, and 670 are controlled and managed by the VA operating system 400 in FIG. 4A. Furthermore, the sequence of instances 610, 620, 630, 640, 650, 660, and 670 are rendered and presented by the rendering architecture 450 in FIG. 4B. As noted above, the VA operating system 400 and the rendering architecture 450 may both be included in the controller 110 shown in FIGS. 1 and 2; the electronic device 120 shown in FIGS. 1 and 3; and/or a suitable combination thereof.

According to some implementations, in the sequence of instances 610, 620, 630, 640, 650, 660, and 670, the VA operating system 400 controls and/or drives a VA 602 within the virtual environment 128 in order to accomplish or complete a macro task. For example, in the sequence of instances 610, 620, 630, 640, 650, 660, and 670, the macro task corresponds to locating and picking-up a virtual object 604 within the virtual environment 128.

As shown in FIGS. 6A-6G, the VA runtime scenario includes a physical environment 105 and a virtual environment 128 displayed on the display 122 of the electronic device 120. The electronic device 120 presents the virtual environment 128 to the user 150 while the user 150 is physically present within the physical environment 105 and a portion thereof is within the FOV 111 of an exterior-facing image sensor of the electronic device 120. As such, in some implementations, the user 150 holds the electronic device 120 in his/her hand(s) similar to the operating environment 100 in FIG. 1.

In other words, in some implementations, the electronic device 120 is configured to present virtual content and to enable optical see-through or video pass-through of at least a portion of the physical environment 105 on the display 122. For example, the electronic device 120 corresponds to a mobile phone, tablet, laptop, near-eye system, wearable computing device, or the like.

Figure 6A:
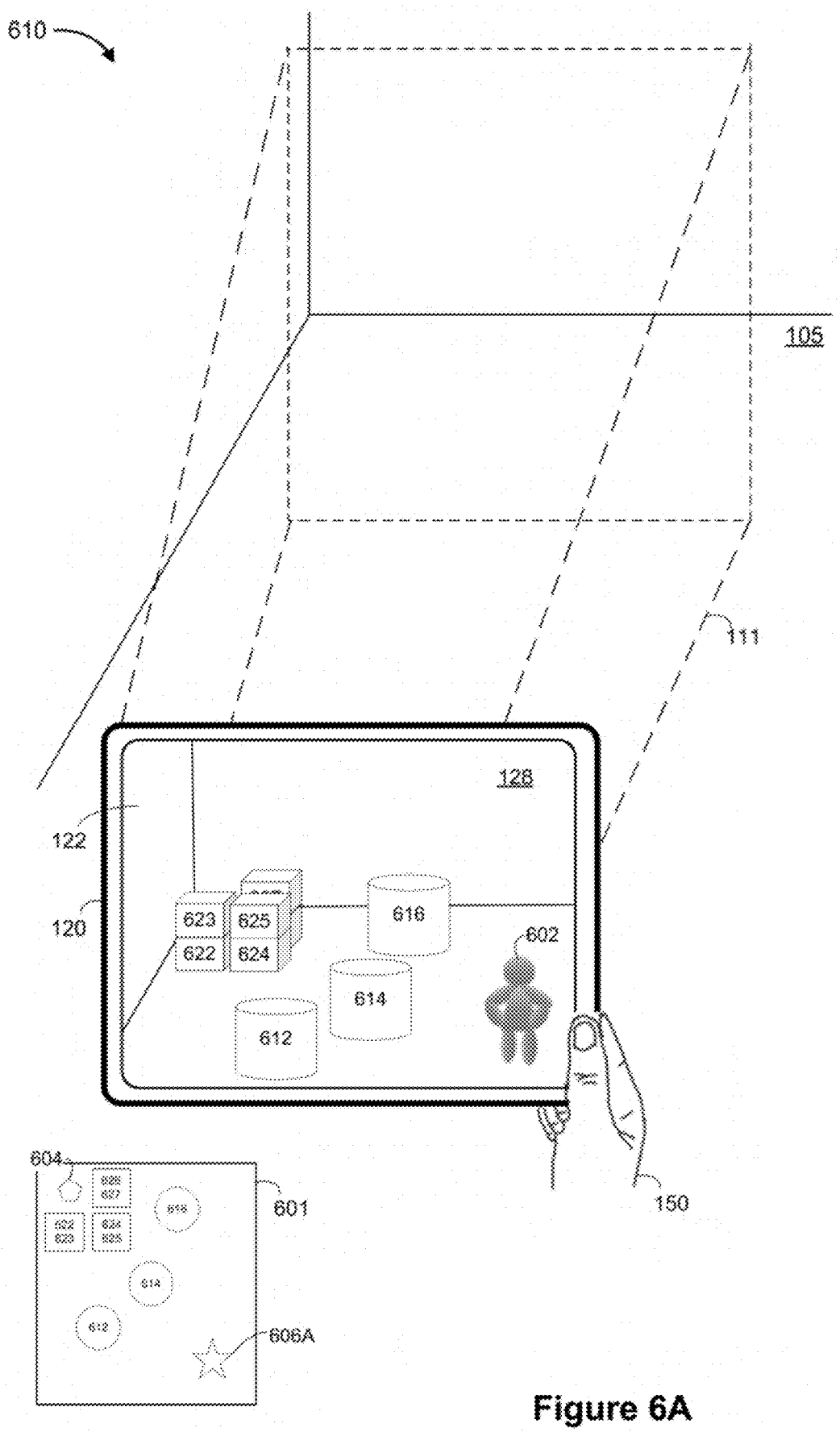
FIGS. 6A-6G illustrate a sequence of instances for an example VA runtime scenario in accordance with some implementations.

As shown in FIG. 6A, during the instance 610 (e.g., associated with time $T_1$) of the VA runtime scenario, the electronic device 120 presents a virtual environment 128 including a VA 602 and virtual obstacles 612, 614, and 616. The virtual environment 128 also includes the virtual object 604 associated with the macro task (e.g., locating and picking-up the virtual object 604) behind stacked boxes 622, 623, 624, 625, 626, and 627. FIG. 6A-6G also include a top-down view 601 of the virtual environment 128 for ease of reference. As shown in FIG. 6A, the VA 602 is currently located at position 606A.

For example, at time $T_1$, the VA operating system 400 or a component thereof (e.g., the task generation engine 410 in FIGS. 2 and 4A) generates a search-tree based on the macro task (e.g., locating and picking-up the virtual object 604 with the virtual environment 128), the VA profile for the VA 602, and the current state information associated with the VA 602 and the virtual environment 128 for the time $T_1$. Continuing with this example, the VA operating system 400 or a component thereof (e.g., the motion planning engine 420 in FIGS. 2 and 4A) generates a lookahead planning gradient based on the search-tree and the current state information associated with the VA 602 and the virtual environment 128 for the time $T_1$. Continuing with this example, the VA operating system 400 or a component thereof (e.g., the task selector 442 in FIGS. 2 and 4A) selects a task node from the search-tree (e.g., walking towards the virtual object 604 while avoiding the virtual obstacles 612, 614, and 616). Continuing with this example, the VA operating system 400 or a component thereof (e.g., the actuator 444 in FIGS. 2 and 4A) actuates the VA 602 within the virtual environment 128 based on the PMP from the lookahead planning gradient that corresponds to the selected task node tree (e.g., walking towards the virtual object 604 while avoiding the virtual obstacles 612, 614, and 616).

Figure 6B:
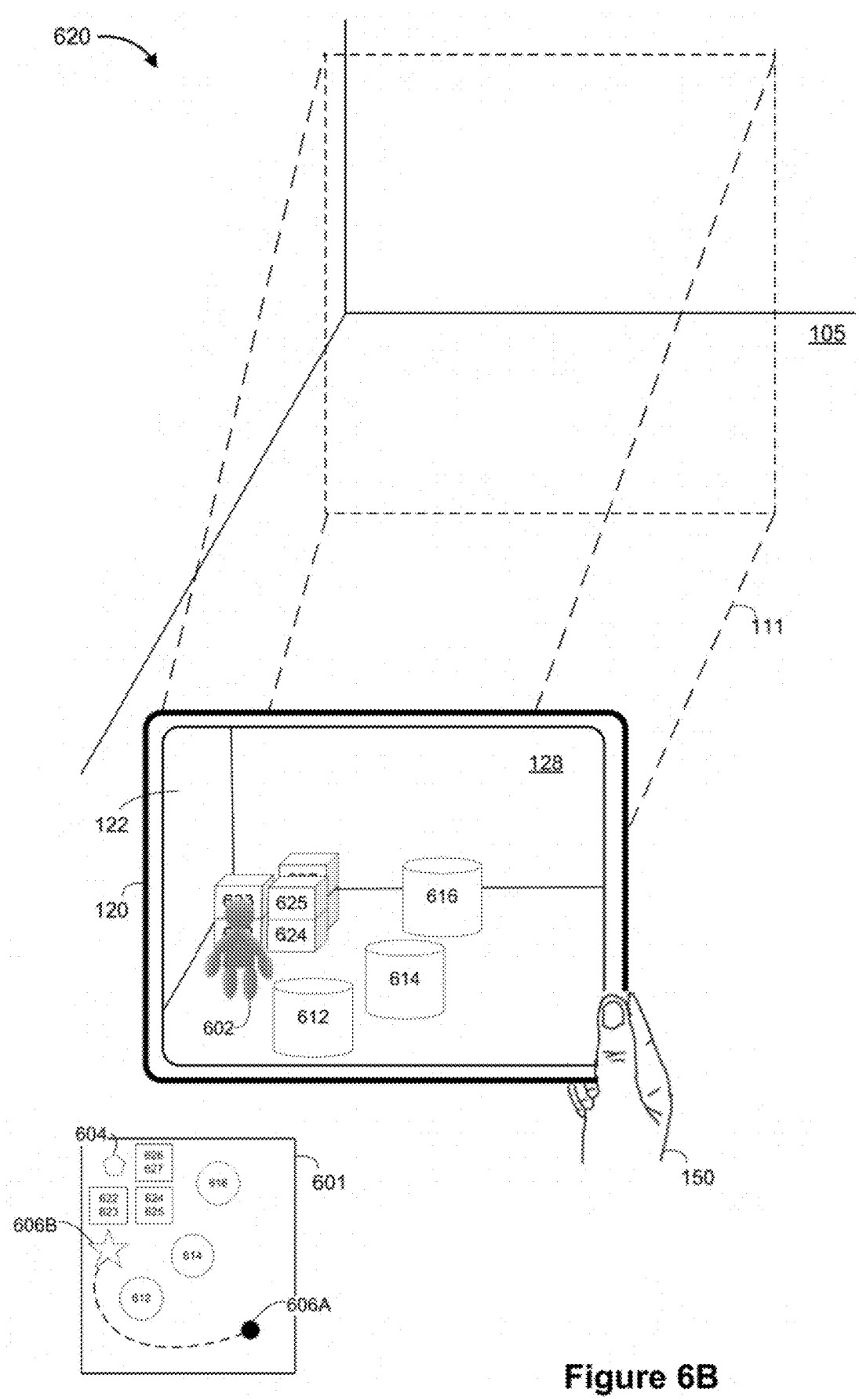

As such, between FIGS. 6A and 6B, the electronic device 120 presents the VA 602 walking towards the virtual object 604 while avoiding the virtual obstacles 612, 614, and 616 according to the path between positions 606A and 606B. As shown in FIG. 6B, during the instance 620 (e.g., associated with time $T_2$) of the VA runtime scenario, the electronic device 120 presents the VA 602 at position 606B.

For example, at time $T_2$, the VA operating system 400 or a component thereof (e.g., the task generation engine 410 in FIGS. 2 and 4A) updates the search-tree based on the macro task (e.g., locating and picking-up the virtual object 604 with the virtual environment 128), the VA profile for the VA 602, and the current state information associated with the VA 602 and the virtual environment 128 for the time $T_2$. Continuing with this example, the VA operating system 400 or a component thereof (e.g., the motion planning engine 420 in FIGS. 2 and 4A) updates the lookahead planning gradient based on the updated search-tree and the current state information associated with the VA 602 and the virtual environment 128 for the time $T_2$. Continuing with this example, the VA operating system 400 or a component thereof (e.g., the task selector 442 in FIGS. 2 and 4A) selects a task node from the search-tree (e.g., grabbing and moving the boxes 623 and 622). Continuing with this example, the VA operating system 400 or a component thereof (e.g., the actuator 444 in FIGS. 2 and 4A) actuates the VA 602 within the virtual environment 128 based on the PMP from the lookahead planning gradient that corresponds to the selected task node (e.g., grabbing and moving the boxes 623 and 622).

Figure 6C:
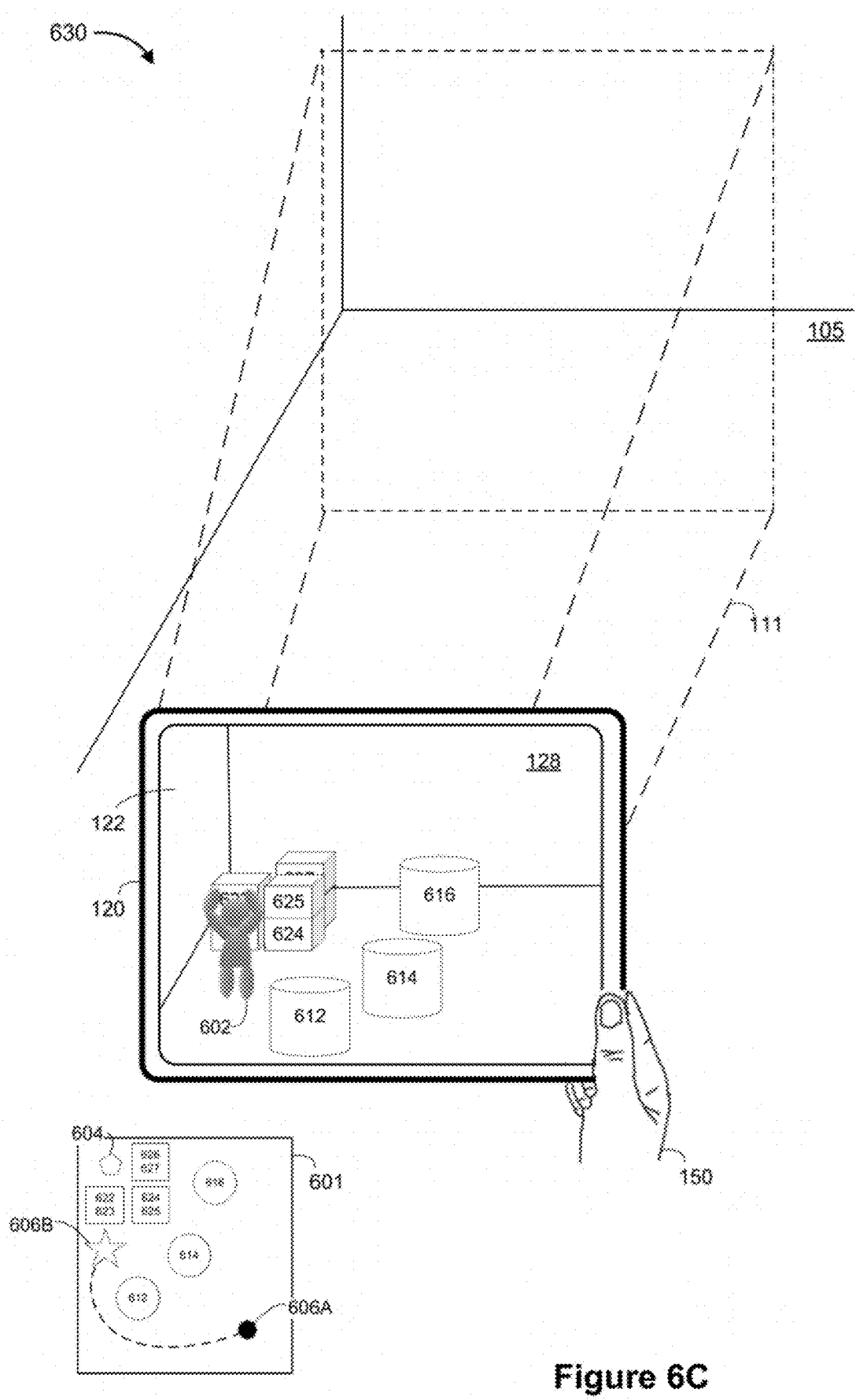
Figure 6D:
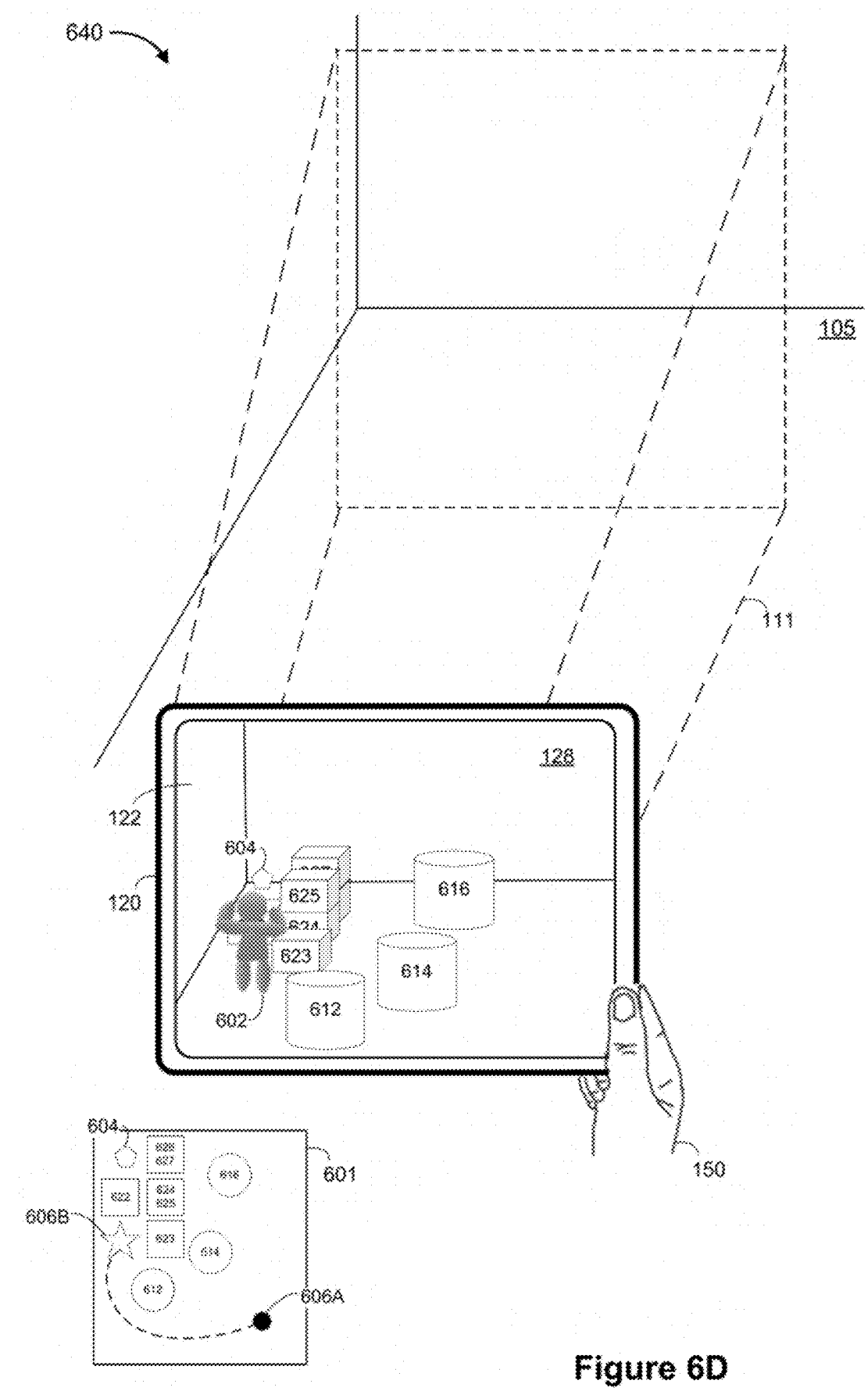
Figure 6E:
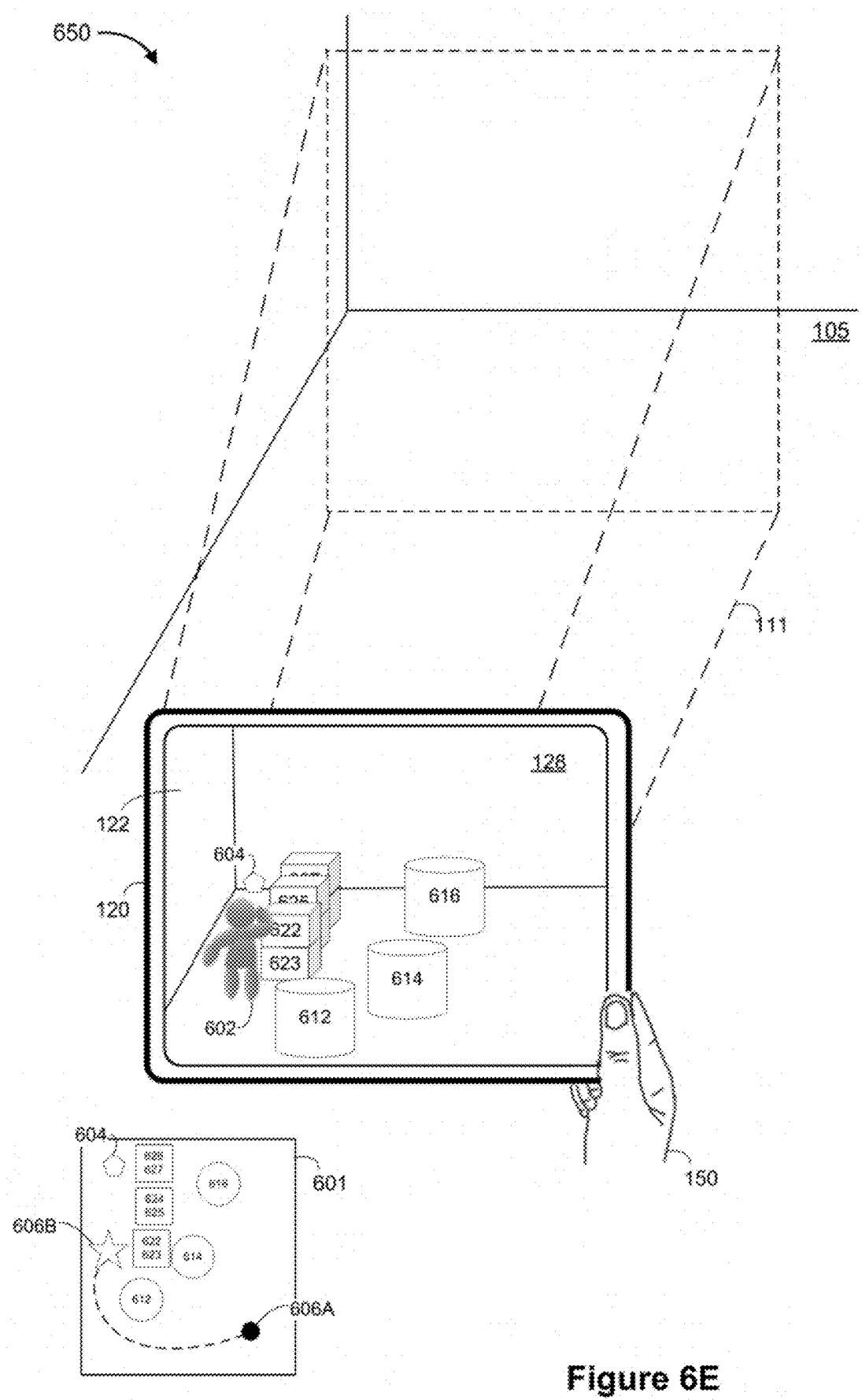

As such, between FIGS. 6B-6E, the electronic device 120 presents the VA 602 grabbing and moving the boxes 623 and 622 to the floor of the virtual environment 128 in order to access the virtual object 604. As shown in FIG. 6C, during the instance 630 (e.g., associated with time T3) of the VA runtime scenario, the electronic device 120 presents the VA 602 grabbing the box 623 from the position 606B. As shown in FIG. 6D, during the instance 640 (e.g., associated with time T4) of the VA runtime scenario, the electronic device 120 presents the box 623 on the floor of the virtual environment 128. Furthermore, during the instance 640 (e.g., associated with time T4) of the VA runtime scenario, the electronic device 120 presents the VA 602 grabbing the box 622 from the position 606B. As shown in FIG. 6E, during the instance 650 (e.g., associated with time $T_5$) of the VA runtime scenario, the electronic device 120 presents the box 622 stacked on top of the box 623. As such, in FIG. 6E, the virtual object 604 is now visible to the user 150 and accessible to the VA 602.

For example, at time $T_5$, the VA operating system 400 or a component thereof (e.g., the task generation engine 410 in FIGS. 2 and 4A) updates the search-tree based on the macro task (e.g., locating and picking-up the virtual object 604 with the virtual environment 128), the VA profile for the VA 602, and the current state information associated with the VA 602 and the virtual environment 128 for the time $T_5$. Continuing with this example, the VA operating system 400 or a component thereof (e.g., the motion planning engine 420 in FIGS. 2 and 4A) updates the lookahead planning gradient based on the updated search-tree and the current state information associated with the VA 602 and the virtual environment 128 for the time $T_5$. Continuing with this example, the VA operating system 400 or a component thereof (e.g., the task selector 442 in FIGS. 2 and 4A) selects a task node from the search-tree (e.g., walking to the virtual object 604 and picking up the virtual object 604). Continuing with this example, the VA operating system 400 or a component thereof (e.g., the actuator 444 in FIGS. 2 and 4A) actuates the VA 602 within the virtual environment 128 based on the PMP from the lookahead planning gradient that corresponds to the selected task node (e.g., walking to the virtual object 604 and picking up the virtual object 604).

Figure 6F:
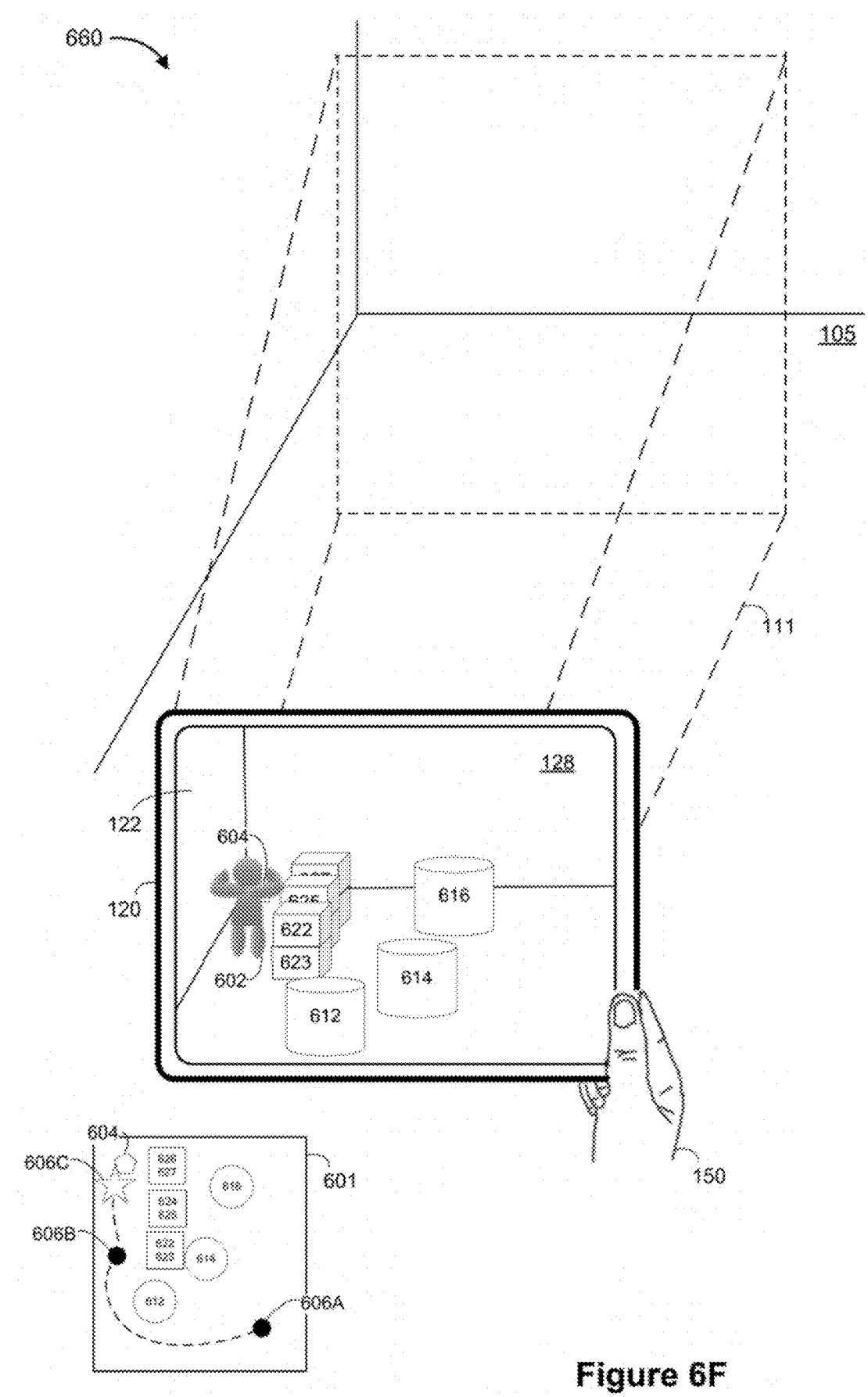
Figure 6G:
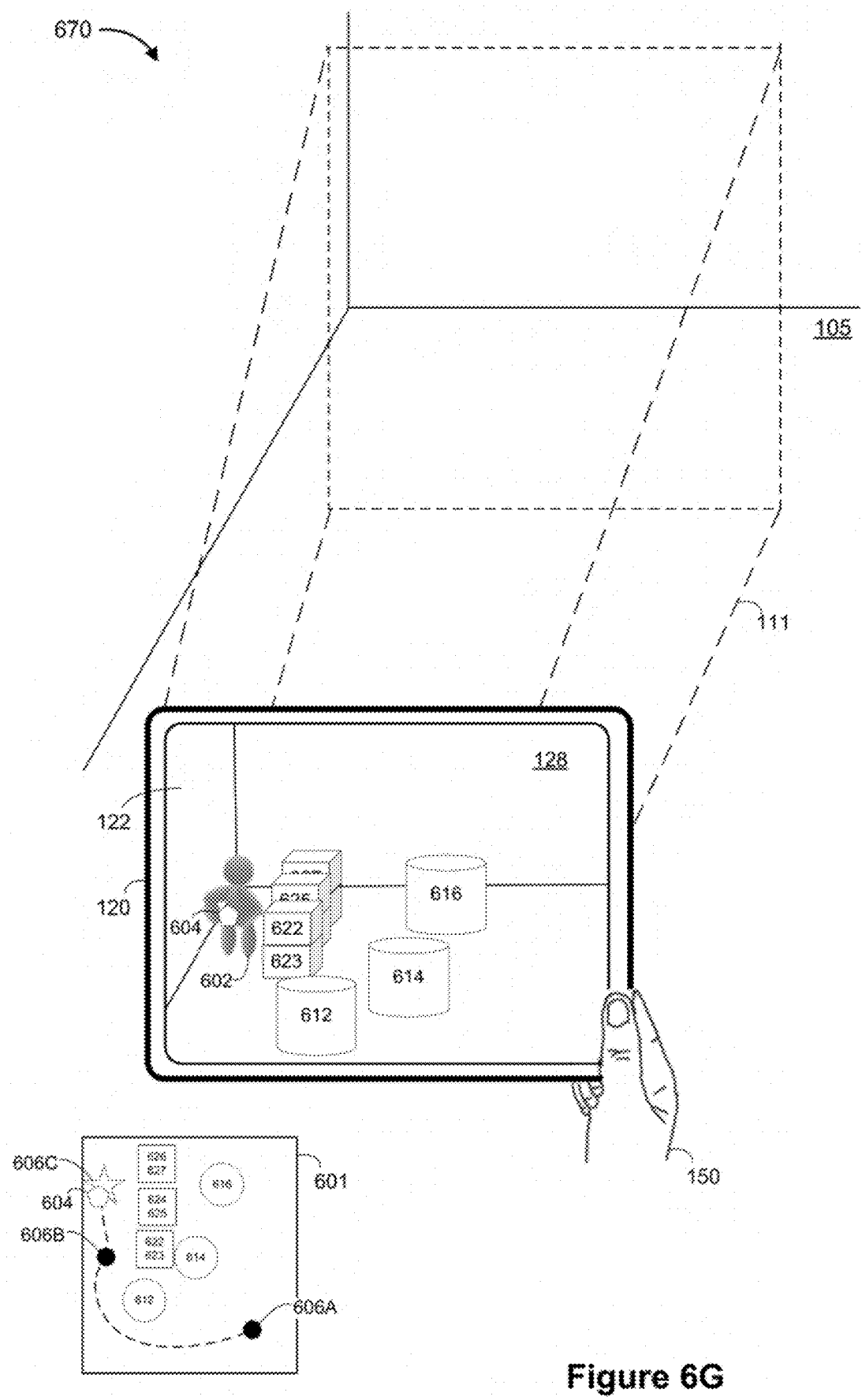

As such, between FIGS. 6E-6G, the electronic device 120 presents the VA 602 walking to the virtual object 604 and picking up the virtual object 604 in order to accomplish or complete the macro task (e.g., locating and picking-up a virtual object 604 within the virtual environment 128). Between FIGS. 6E and 6F, the electronic device 120 presents the VA 602 walking towards the virtual object 604 according to the path between positions 606B and 606C. As shown in FIG. 6F, during the instance 660 (e.g., associated with time $T_6$) of the VA runtime scenario, the electronic device 120 presents the VA 602 at position 606C nearby the virtual object 604. Between FIGS. 6F and 6G, the electronic device 120 presents the VA 602 picking up the virtual object 604 from the position 606C. As shown in FIG. 6G, during the instance 670 (e.g., associated with time $T_7$) of the VA runtime scenario, the electronic device 120 presents the VA 602 holding the virtual object 604. As such, the macro task is complete at the time $T_7$ within the instance 670.

FIG. 7 illustrates an example evolution of a search-tree and associated lookahead planning gradients in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, FIG. 7 shows states 710, 730, and 760 for the evolution of the search-tree and associated lookahead planning gradients over time.

According to some implementations, with reference to FIG. 4A, the VA operating system 400 or a component thereof (e.g., the task generation engine 410 in FIGS. 2 and 4A) generates the first search-tree 715 based on a macro task, a VA profile, and current state information for the VA and the virtual environment associated with the VA. In some implementations, with reference to FIG. 4A, the VA operating system 400 or a component thereof (e.g., the motion planning engine 420 in FIGS. 2 and 4A) generates the first lookahead planning gradient 720 based on the first search-tree 715 and the current state information for the VA and the virtual environment associated with the VA.

As shown in FIG. 7, in state 710, the first search-tree 715 includes a plurality of task nodes grouped into layers 702, 703, 704, 705, and 706. For example, each task node corresponds to a task in furtherance of an overall macro task and/or one or more actions to accomplish the associated task. In FIG. 7, the black task nodes in the search-trees 715, 740, and 770 correspond to tasks/actions that have been performed by the virtual agent. In FIG. 7, the white task nodes in the search-trees 715, 740, and 770 correspond to prospective or retrospective tasks/actions that have not been performed by the virtual agent.

In the state 710, the first lookahead planning gradient 720 includes high resolution/complexity PMPs for a first portion 722 of the task nodes in the first search-tree 715 associated with the layers 702 and 703. In the state 710, the first lookahead planning gradient 720 includes medium resolution/complexity PMPs for a second portion 724 of the task nodes in the first search-tree 715 associated with the layer 704. In the state 710, the first lookahead planning gradient 720 includes low resolution/complexity PMPs for a third portion 726 of the task nodes in the first search-tree 715 associated with the layer 705.

According to some implementations, with reference to FIG. 4A, the VA operating system 400 or a component thereof (e.g., the task generation engine 410 in FIGS. 2 and 4A) generates a second search-tree 740 based on the macro task, the VA profile, and current state information for the VA and the virtual environment associated with the VA. In some implementations, the task generation engine 410 recycles, reuses, etc. some portions of the first search-tree 715 for the second search-tree 740. According to some implementations, with reference to FIG. 4A, the VA operating system 400 or a component thereof (e.g., the motion planning engine 420 in FIGS. 2 and 4A) generates a second lookahead planning gradient 750 based on the second search-tree 740 and the current state information for the VA and the virtual environment associated with the VA. In some implementations, the motion planning engine 420 recycles, reuses, etc. some portions of the first lookahead planning gradient 720 for the second lookahead planning gradient 750.

As shown in FIG. 7, in state 730, the second search-tree 740 includes a plurality of task nodes grouped into layers 702, 703, 704, 705, 706, and 707. In the state 730, the second lookahead planning gradient 750 includes high resolution/complexity PMPs for a first portion 752 of the task nodes in the second search-tree 740 associated with the layers 703 and 704. In the state 730, the second lookahead planning gradient 750 includes medium resolution/complexity PMPs for a second portion 754 of the task nodes in the second search-tree 740 associated with the layers 705 and 706. In the state 730, the second lookahead planning gradient 750 includes low resolution/complexity PMPs for a third portion 756 of the task nodes in the second search-tree 740 associated with layer the 707.

According to some implementations, with reference to FIG. 4A, the VA operating system 400 or a component thereof (e.g., the task generation engine 410 in FIGS. 2 and 4A) generates a third search-tree 770 based on the macro task, the VA profile, and current state information for the VA and the virtual environment associated with the VA. In some implementations, the task generation engine 410 recycles, reuses, etc. some portions of the second search-tree 740 for the third search-tree 770. According to some implementations, with reference to FIG. 4A, the VA operating system 400 or a component thereof (e.g., the motion planning engine 420 in FIGS. 2 and 4A) generates a third lookahead planning gradient 780 based on the third search-tree 770 and the current state information for the VA and the virtual environment associated with the VA. In some implementations, the motion planning engine 420 recycles, reuses, etc. some portions of the second lookahead planning gradient 750 for the third lookahead planning gradient 780.

As shown in FIG. 7, in state 760, the third search-tree 770 includes a plurality of task nodes grouped into layers 702, 703, 704, 705, 706, and 707. In the state 760, the third lookahead planning gradient 780 includes high resolution/complexity PMPs for a first portion 782 of the task nodes in the third search-tree 770 associated with the layers 704 and 705. In the state 760, the third lookahead planning gradient 780 includes medium resolution/complexity PMPs for a second portion 784 of the task nodes in the third search-tree 770 associated with the layer 706. In the state 760, the third lookahead planning gradient 780 includes low resolution/complexity PMPs for a third portion 786 of the task nodes in the third search-tree 770 associated with the layer 707.

Figure 8A:
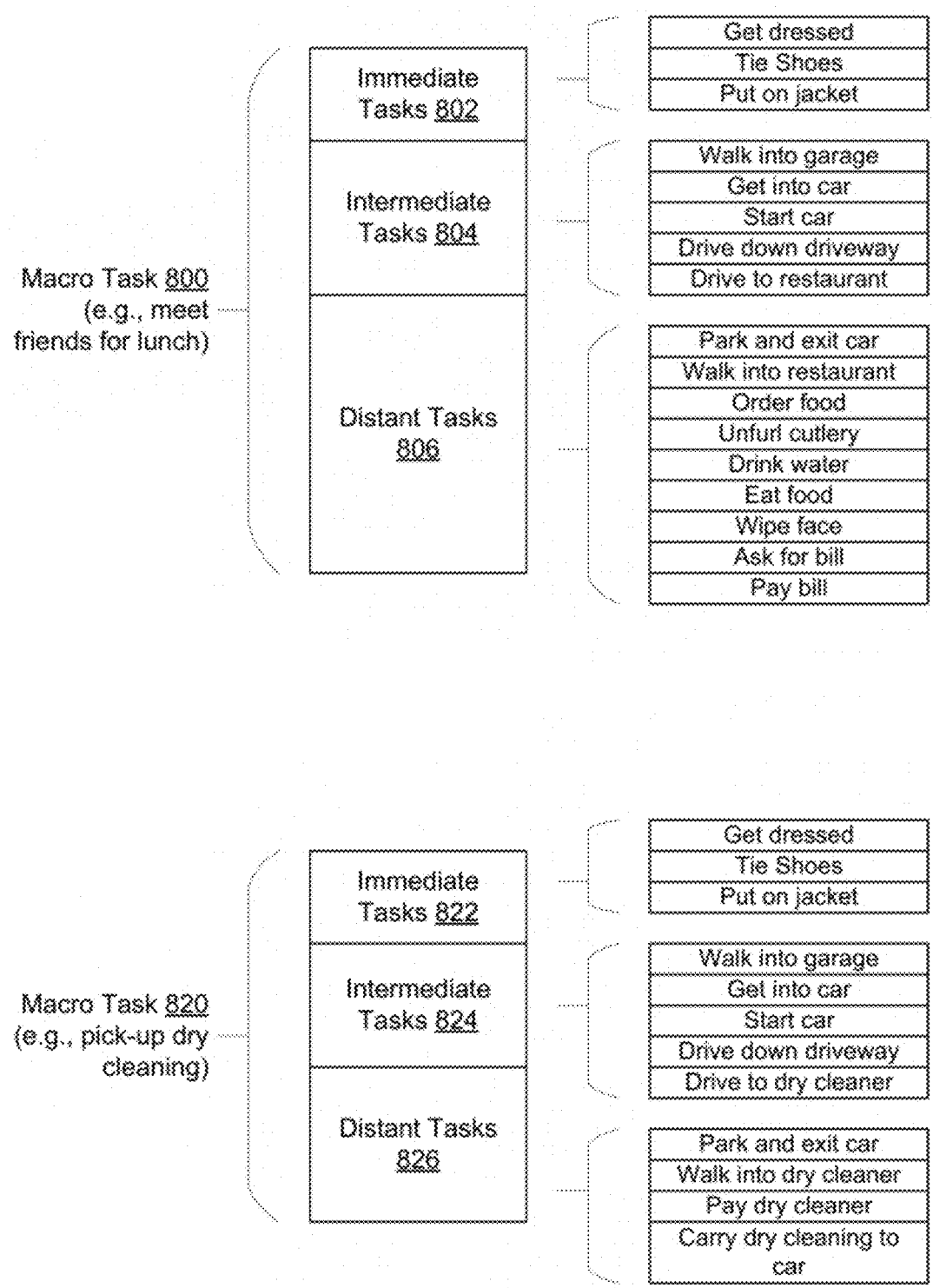
FIG. 8A illustrates example macro tasks in accordance with some implementations.

FIG. 8A illustrates a first example macro task 800 and a second macro task 820 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, FIG. 8A shows a first macro task 800 associated with meeting friends for lunch and a second macro task associated with picking up dry cleaning. According to some embodiments, the VA operating system 400 obtains two or more macro tasks and generates a combined macro task based thereon.

As shown in FIG. 8A, the first macro task 800 includes a plurality of immediate tasks 802 that are temporally close to the current time period: get dressed, tie shoes, and put on jacket. The first macro task 800 also includes a plurality of intermediate tasks 804 that are temporally further away from the current time period: walk into garage, get into car, start car, drive down driveway, and drive to restaurant. The first macro task 800 also includes a plurality of distant tasks 806 that are temporally distant from the current time period: park and exit car, walk into restaurant, order food, unfurl cutlery, drink water, eat food, wipe face, ask for bill, and pay bill. For example, the immediate tasks 802 may be the most detailed and the intermediate tasks 804 and the distance tasks 806 may be less detailed (e.g., more abstract). In some implementations, the intermediate tasks 804 and the distance tasks 806 may reference separate plans, conditional-plans, behaviors, policies for selecting granular actions, and/or the like.

As shown in FIG. 8A, the second macro task 820 includes a plurality of immediate tasks 822 that are temporally close to the current time period: get dressed, tie shoes, and put on jacket. The second macro task 820 also includes a plurality of intermediate tasks 824 that are temporally further away from the current time period: walk into garage, get into car, start car, drive down driveway, and drive to dry cleaner. The second macro task 820 also includes a plurality of distant tasks 826 that are temporally distant from the current time period: park and exit car, walk into dry cleaner, pay dry cleaner, and carry dry cleaning to car. For example, the immediate tasks 802 may be the most detailed and the intermediate tasks 824 and the distance tasks 826 may be less detailed (e.g., more abstract). In some implementations, the intermediate tasks 824 and the distance tasks 826 may reference separate plans, conditional-plans, behaviors, policies for selecting granular actions, and/or the like.

Figure 8B:
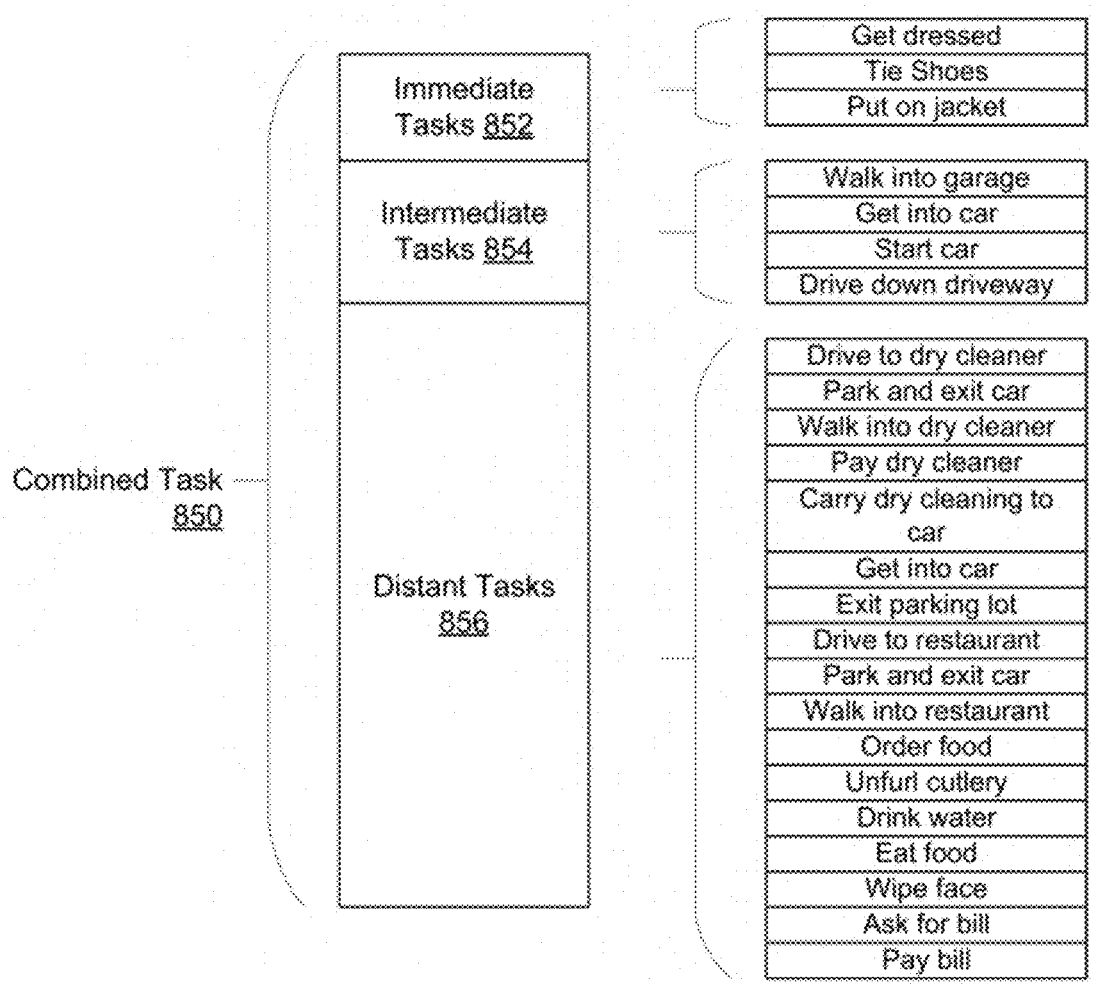
FIG. 8B illustrates an example combined macro task(s) based on the macro tasks in FIG. 8A in accordance with some implementations.

FIG. 8B illustrates an example combined macro task 850 based on the first macro task 800 and the second macro task 820 in FIG. 8A in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, FIG. 8B shows a combined macro task 850 associated with picking up dry cleaning and later meeting friends for lunch. According to some embodiments, the VA operating system 400 obtains the first macro task 800 and the second macro task 820, and the VA operating system 400 generates the combined macro task 850 based thereon.

As shown in FIG. 8B, the combined macro task 850 includes a plurality of immediate tasks 852 that are temporally close to the current time period: get dressed, tie shoes, and put on jacket. The combined macro task 850 also includes a plurality of intermediate tasks 854 that are temporally further away from the current time period: walk into garage, get into car, start car, and drive down driveway. The combined macro task 850 also includes a plurality of distant tasks 856 that are temporally distant from the current time period: drive to dry cleaner, park and exit car, walk into dry cleaner, pay dry cleaner, and carry dry cleaning to car, exit parking lot, drive to restaurant, walk into restaurant, order food, unfurl cutlery, drink water, eat food, wipe face, ask for bill, and pay bill. For example, the immediate tasks 852 may be the most detailed and the intermediate tasks 854 and the distance tasks 856 may be less detailed (e.g., more abstract). In some implementations, the intermediate tasks 854 and the distance tasks 856 may reference separate plans, conditional-plans, behaviors, policies for selecting granular actions, and/or the like.

Figure 9A:
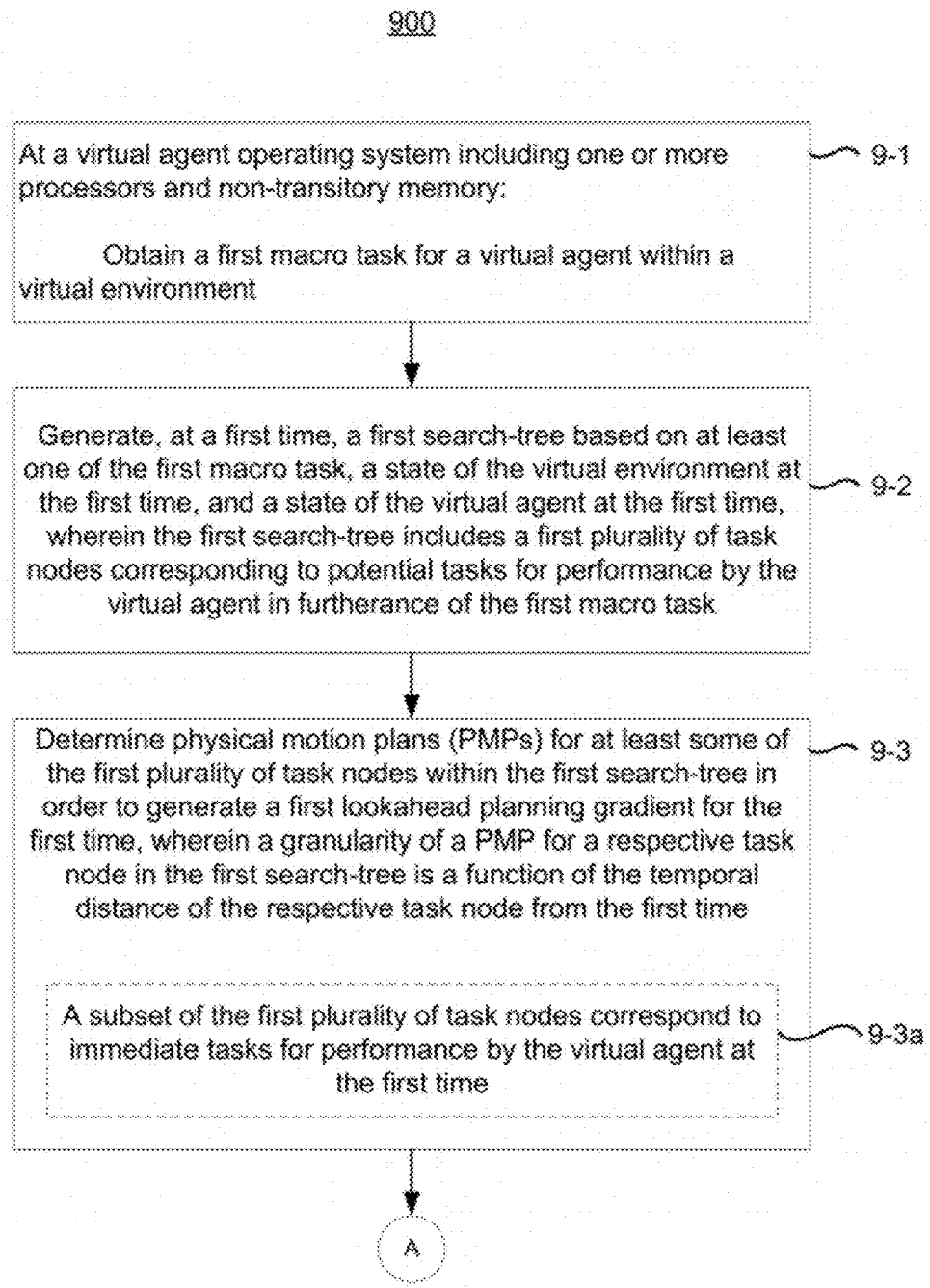
FIGS. 9A and 9B are a flowchart representation of a method of improved motion planning in accordance with some implementations.
Figure 9B:
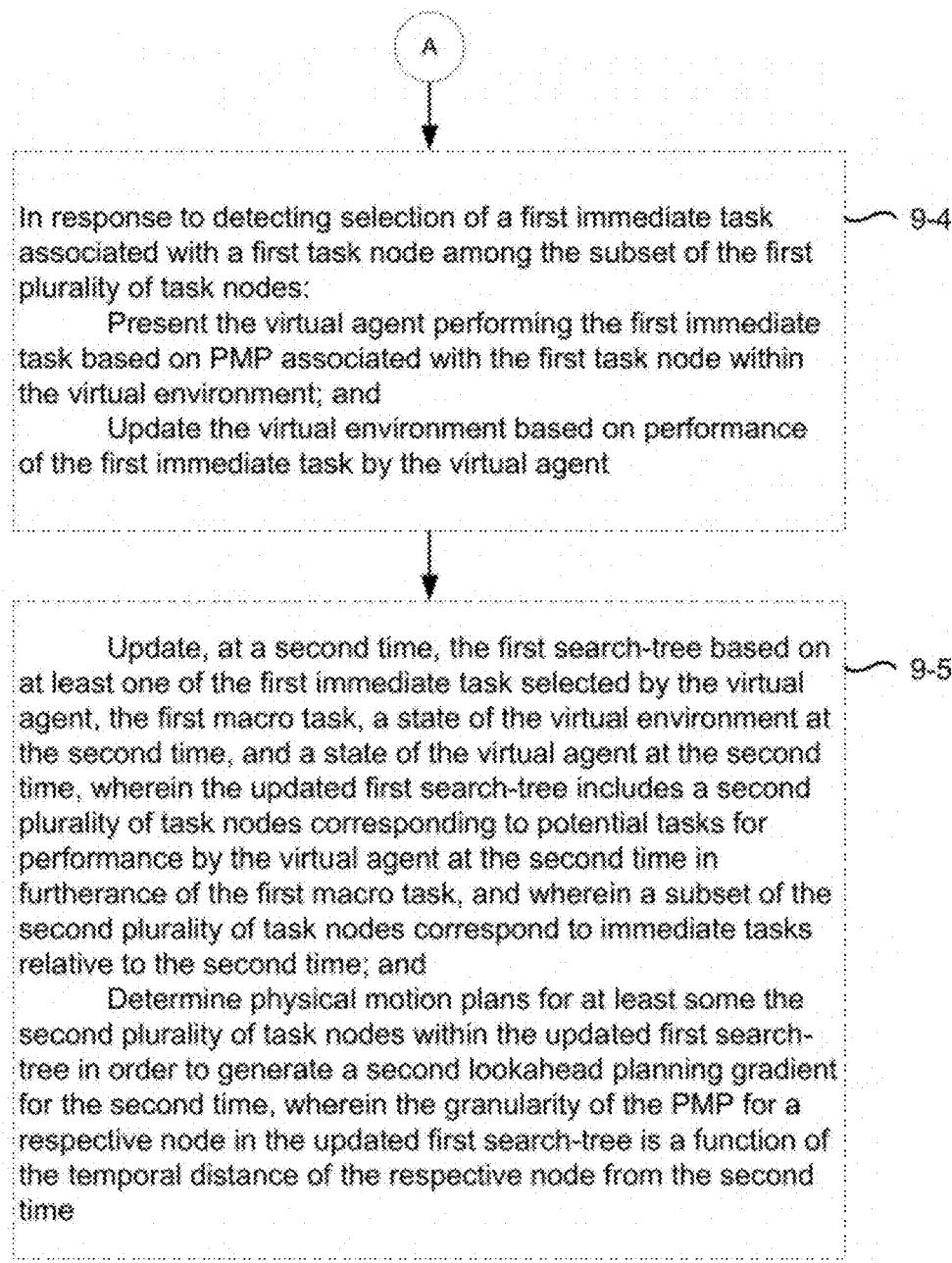

FIGS. 9A and 9B illustrate a flowchart representation of a method 900 of improved motion planning in accordance with some implementations. In various implementations, the method 900 is performed at a virtual agent (VA) operating system including one or more processors and non-transitory memory (e.g., the electronic device 120 shown in FIGS. 1 and 3; the controller 110 in FIGS. 1 and 2; or a suitable combination thereof). In some implementations, the VA operating system is communicatively coupled to a display device and one or more input devices. In some implementations, the method 900 is performed by processing logic, including hardware, firmware, software, or a combination thereof. In some implementations, the method 900 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

As discussed above, in some instances, motion planning for a virtual agent can be a resource intensive exercise. Furthermore, from a resource consumption standpoint, performing motion planning for potential tasks becomes more speculative and computationally wasteful the further into the future the planning horizon is. In various implementations, a VA operating system generates a lookahead planning gradient for a search-tree in order to conserve computational resources, wherein the granularity of the physical motion planning for a respective node of the search-tree is a function of its temporal distance to the root node.

As represented by block 9-1, the method 900 includes obtaining a first macro task for a virtual agent (VA) within a virtual environment. In some implementations, the VA operating system or a component thereof (e.g., the task generation engine 410 in FIGS. 2 and 4A) obtains (e.g., receives, retrieves, selects, or generates) the macro task for the VA. In some implementations, the macro task is randomly or pseudo-randomly selected from a bank of tasks by the VA operating system. In some implementations, the VA operating system or a component thereof detects a user input (e.g., a voice command, gestural input, selection from a UI menu of tasks, etc.) associated with the selection of the macro task 404.

For example, the macro task corresponds to a goal, objective, or the like for the VA to complete or accomplish within the virtual environment such as locate and eat a block of cheese, eat lunch with friends, pick-up dry cleaning, clean the bathroom, and/or the like. In some implementations, the macro task may be accompanied with a time constraint (e.g., accomplish within 10 minutes or abort), formality constraints (e.g., wear a suit while performing the task), and/or other constraints (e.g., user provided, crowd-sourced, task-specific, etc. constraints). For example, the VA operating system instantiates the VA into the virtual environment before or after the planning process occurs. For example, the virtual environment is a partially or fully XR environment.

In some implementations, the state of the virtual environment corresponds to at least one of locations and trajectories of objects within the virtual environment, environment conditions, and/or the like. In some implementations, the state of the virtual agent corresponds to at least one of translational coordinates, rotational coordinates, time constraints, formality considerations, and/or the like. FIG. 5, described in detail above, shows an example data structure for the current state information 406, 447 including the current state information for the VA and the current state information for the virtual environment.

As represented by block 9-2, the method 900 includes generating, at a first time, a first search-tree based on at least one of: (a) the first macro task, (b) a state of the virtual environment at the first time, and (c) a state of the virtual agent at the first time, wherein the first search-tree includes a first plurality of task nodes corresponding to potential tasks for performance by the virtual agent in furtherance of the first macro task. In some implementations, the VA operating system or a component thereof (e.g., the task generation engine 410 in FIGS. 2 and 4A) generates a search-tree for a current time period based on: (a) a macro task, (b) a VA profile, and (c) state information for the current time period associated with the virtual agent and the virtual environment. FIG. 5, described in detail above, shows an example data structure for a VA profile 402.

As represented by block 9-3, the method 900 includes determining physical motion plans (PMPs) for at least some of the first plurality of task nodes within the first search-tree in order to generate a first lookahead planning gradient for the first time, wherein a granularity of a PMP for a respective task node in the first search-tree is a function of the temporal distance of the respective task node from the first time. In some implementations, the VA operating system or a component thereof (e.g., the motion planning engine 420 in FIGS. 2 and 4A) generates a lookahead planning gradient based on the search-tree generated by the task generation engine 410 for the current time period and the initial state information.

In some implementations, the granularity of the PMPs corresponds to full resolution, partial resolution, and low/zero resolution PMP. As shown in FIG. 4A, a first portion 432 of the lookahead planning gradient 425 corresponds to high resolution/complexity PMP for immediate tasks within the search-tree 415. Continuing with this example, in FIG. 4A, a second portion 434 of the lookahead planning gradient 425 corresponds to medium resolution/complexity PMP for intermediate tasks within the search-tree 415. And, with reference to FIG. 4A, a third portion 436 of the lookahead planning gradient 425 corresponds to low resolution/complexity PMP for distant tasks within the search-tree 415. In some implementations, the motion planning engine 420 performs full resolution PMP for immediate tasks and/or low entropy tasks within the first search-tree. For example, immediate task(s) may be the most detailed and the intermediate task(s) and the distant task(s) may be less detailed (e.g., more abstract). For example, the intermediate task(s) and the distant task(s) may reference separate plans, conditional-plans, behaviors, policies for selecting granular actions, and/or the like.

In some implementations, as represented by block 9-3*a*, a subset of the first plurality of task nodes correspond to immediate tasks for performance by the virtual agent at the first time. In some implementations, the VA operating or a component thereof (e.g., the task selector 442 in FIGS. 2 and 4A) selects a task node (associated with a specific task for the current time period) from the search-tree for the current time period.

In some implementations, as represented by block 9-4, the method 900 includes: in response to detecting selection of a first immediate task associated with a first task node among the subset of the first plurality of task nodes: presenting the virtual agent performing the first immediate task based on PMP associated with the first task node within the virtual environment; and updating the virtual environment based on performance of the first immediate task by the virtual agent. For example, immediate task(s) may be the most detailed and the intermediate task(s) and the distant task(s) may be less detailed (e.g., more abstract). For example, the intermediate task(s) and the distant task(s) may reference separate plans, conditional-plans, behaviors, policies for selecting granular actions, and/or the like.

In some implementations, with reference to FIG. 4B, the rendering architecture 450 or a component thereof (e.g., the pose determiner 482 in FIGS. 2 and 4B) determines a current camera pose of the electronic device 120 and/or the user 150 relative to the VA and the associated XR content within the virtual environment. In some implementations, with reference to FIG. 4B, the rendering architecture 450 or a component thereof (e.g., the renderer 484 in FIGS. 2 and 4B) renders the VA performing the one or more actions associated with the first immediate task within the virtual environment and the associated XR content according to the current camera pose relative thereto. In some implementations, with reference to FIG. 4B, the rendering architecture 450 or a component thereof (e.g., the image processing architecture 492 in FIGS. 2 and 4B) obtains an image stream from an image capture device including one or more images of the physical environment 105 from the current camera pose of the electronic device 120 and/or the user 150. In some implementations, with reference to FIG. 4B, the rendering architecture 450 or a component thereof (e.g., the compositor 494 in FIGS. 2 and 4B) composites the rendered VA and the XR content 455 with the processed image stream of the physical environment 105 from the image processing architecture 492 to produce rendered image frames of the XR environment. In some implementations, with reference to FIG. 4B, the rendering architecture 450 or a component thereof (e.g., the presenter 344 in FIGS. 2 and 4B) presents the rendered image frames of the XR environment to the user 150 via the one or more displays 312. One of ordinary skill in the art will appreciate that the optional image processing architecture 492 and the optional compositor 494 may not be applicable for fully virtual environments.

In some implementations, presenting the VA performing the one or more actions within the virtual environment includes projecting the VA performing one or more actions within the virtual environment onto a transparent lens assembly. In some implementations, presenting the VA performing the one or more actions within the virtual environment includes compositing the VA performing one or more actions with one or more images of a physical environment captured by an exterior-facing image sensor.

In some implementations, as represented by block 9-5, the method 900 includes: updating, at a second time, the first search-tree based on at least one of: (i) the first immediate task selected by the virtual agent, (ii) the first macro task, (iii) a state of the virtual environment at the second time, and (iv) a state of the virtual agent at the second time, wherein the updated first search-tree includes a second plurality of task nodes corresponding to potential tasks for performance by the virtual agent at the second time in furtherance of the first macro task, and wherein a subset of the second plurality of task nodes correspond to immediate tasks relative to the second time; and determining physical motion plans for at least some of the second plurality of task nodes within the updated first search-tree in order to generate a second lookahead planning gradient for the second time, wherein the granularity of the physical motion planning for a respective node in the updated first search-tree is a function of the temporal distance of the respective node from the second time. As one example, FIG. 7 shows states 710, 730, and 760 for the evolution of the search-tree and associated lookahead planning gradients over time.

In some implementations, the second plurality of task nodes at the second time at least partially overlaps with the first plurality of task nodes at the first time. As shown in FIG. 4A, for example, the search-tree 415 is fed back to the task generation engine 410 so that the task generation engine 410 may recycle, reuse, etc. some portion(s) of the search-tree 415 for a subsequent time period.

In some implementations, the second lookahead planning gradient for the second time includes at least some of the physical motion planning from the second lookahead planning gradient for the second time. As shown in FIG. 4A, for example, the lookahead planning gradient 425 is fed back to the motion planning engine 420 so that the motion planning engine 420 may recycle, reuse, etc. some portion(s) of the lookahead planning gradient 425 for a subsequent time period.

In some implementations, the first search-tree is associated with a first temporal horizon, and wherein the second search-tree is associated with a second temporal horizon. In some implementations, the first and second temporal horizons correspond to a same temporal value.

In some implementations, the method 900 includes: determining the first temporal horizon based on at least one of: (A) the first macro task, (B) the state of the virtual environment at the first time, (C) the state of the virtual agent at the first time, and (D) the subset of the first plurality of task nodes that correspond to immediate tasks relative to the first time; and determining the first temporal horizon based on at least one of: (i) the first immediate task selected by the virtual agent, (ii) the first macro task, (iii) the state of the virtual environment at the second time, (iv) the state of the virtual agent at the second time, and (v) the subset of the second plurality of task. As shown in FIG. 7, the lookahead planning gradients 720, 750, and 780 are associated with different shapes, sizes, and/or temporal horizons.

In some implementations, the method 900 includes: obtaining a second macro task for the virtual agent within the virtual environment; generating, at the first time, a second search-tree based on at least one of: (A) the second macro task, (B) a state of the virtual environment at the first time, and (C) a state of the virtual agent at the first time, wherein second search-tree includes a third plurality of task nodes corresponding to potential tasks for performance by the virtual agent at the first time in furtherance of the second macro task, and wherein a subset of the third plurality of task nodes correspond to immediate tasks relative to the first time; and performing physical motion planning for at least some of the third plurality of task nodes within the second search-tree in order to generate a third lookahead planning gradient for the first time, wherein the granularity of the physical motion planning for a respective task node in the second search-tree is a function of the temporal distance of the respective task node from the first time.

In some implementations, the method 900 includes determining overlapping task nodes between the first and second search-trees. In some implementations, the VA operating system intertwines or interleaves tasks in order to complete the first and second macro tasks in parallel or contemporaneously. In some implementations, the VA operating system divides or separates the tasks in order to complete the first and second macro tasks sequentially. As one example, with reference to FIGS. 8A and 8B, the VA operating system obtains macro tasks 800 and 820 and generates the combined macro task 850 based thereon. The combined task 850, in FIG. 8B, corresponds to interleaved or intertwined tasks from the macro tasks 800 and 820. As such, with reference to FIGS. 8A and 8B, when the VA operating system executes the combined task 850, the first macro task 800 and the second macro task 820 will be completed in a quasi-sequential manner.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including one or more processors, non-transitory memory, and an interface for communicating with a display device and one or more input devices:
        obtaining, via the one or more input devices, a user input that corresponds to a first macro task for a virtual agent within a virtual environment;
        in response to obtaining the user input, generating, at a first time, a first search- tree based on at least one of the first macro task, a state of the virtual environment at the first time, and a state of the virtual agent at the first time, wherein the first search-tree includes a first plurality of task nodes corresponding to potential tasks for performance by the virtual agent in furtherance of the first macro task;
        determining physical motion plans (PMPs) for at least some of the first plurality of task nodes within the first search-tree in order to generate a first lookahead planning gradient for the first time, wherein a granularity of a PMP for a respective task node in the first search- tree is a function of the temporal distance of the respective task node from the first time; and
        causing presentation of, via the display device, the virtual agent performing at least a portion of the PMPs within the virtual environment.

2. The method of claim 1, wherein a subset of the first plurality of task nodes correspond to immediate tasks for performance by the virtual agent at the first time, and the method further comprising:
    in response to detecting selection of a first immediate task associated with a first task node among the subset of the first plurality of task nodes:
        presenting the virtual agent performing the first immediate task based on the PMP associated with the first task node within the virtual environment; and
        updating the virtual environment based on performance of the first immediate task by the virtual agent.

3. The method of claim 2, further comprising:
    updating, at a second time, the first search-tree based on at least one of the first immediate task selected by the virtual agent, the first macro task, a state of the virtual environment at the second time, and a state of the virtual agent at the second time, wherein the updated first search-tree includes a second plurality of task nodes corresponding to potential tasks for performance by the virtual agent at the second time in furtherance of the first macro task, and wherein a subset of the second plurality of task nodes correspond to immediate tasks relative to the second time; and determining PMPs for at least some of the second plurality of task nodes within the updated first search-tree in order to generate a second lookahead planning gradient for the second time, wherein the granularity of the physical motion planning for a respective node in the updated first search-tree is a function of the temporal distance of the respective node from the second time.

4. The method of claim 3, wherein the second plurality of task nodes at the second time at least partially overlaps with the first plurality of task nodes at the first time.

5. The method of claim 3, wherein the second lookahead planning gradient for the second time includes at least some of the physical motion planning from the second lookahead planning gradient for the second time.

6. The method of claim 3, wherein the first search-tree is associated with a first temporal horizon, and wherein the second search-tree is associated with a second temporal horizon.

7. The method of claim 6, wherein the first and second temporal horizons correspond to different temporal values.

8. The method of claim 6, wherein the first and second temporal horizons correspond to a same temporal value.

9. The method of claim 6, further comprising:
determining the first temporal horizon based on at least one of the first macro task, the state of the virtual environment at the first time, the state of the virtual agent at the first time, and the subset of the first plurality of task nodes that correspond to immediate tasks relative to the first time; and
determining the first temporal horizon based on at least one of the first immediate task selected by the virtual agent, the first macro task, the state of the virtual environment at the second time, the state of the virtual agent at the second time, and the subset of the second plurality of task nodes that correspond to immediate tasks relative to the second time.

10. The method of claim 1, wherein the granularity of the PMPs corresponds to full resolution PMP, partial resolution PMP, and zero resolution PMP.

11. The method of claim 1, wherein full resolution PMP is performed on low entropy tasks within the first search-tree.

12. The method of claim 1, wherein the state of the virtual environment corresponds to at least one of locations and trajectories of objects within the virtual environment, environmental lighting characteristics, and environmental audio characteristics.

13. The method of claim 1, wherein the state of the virtual agent corresponds to at least one of translational coordinates associated with the virtual agent and rotational coordinates associated with the virtual agent.

14. The method of claim 1, further comprising:
obtaining a second macro task for the virtual agent within the virtual environment;
generating, at the first time, a second search-tree based on at least one of the second macro task, a state of the virtual environment at the first time, and a state of the virtual agent at the first time, wherein the second search-tree includes a third plurality of task nodes corresponding to potential tasks for performance by the virtual agent at the first time in furtherance of the second macro task, and wherein a subset of the third plurality of task nodes correspond to immediate tasks relative to the first time; and performing a PMP for at least some of the third plurality of task nodes within the second search-tree in order to generate a third lookahead planning gradient for the first time, wherein the granularity of the PMP for a respective task node in the second search-tree is a function of the temporal distance of the respective task node from the first time.

15. The method of claim 14, further comprising:
determining overlapping task nodes between the first and second search-trees.

16. A device comprising:
one or more processors;
a non-transitory memory;
an interface for communicating with a display device and one or more input devices; and
one or more programs stored in the non-transitory memory, which, when executed by the one or more processors, cause the device to:
obtain, via the one or more input devices, a user input that corresponds to a first macro task for a virtual agent within a virtual environment;
in response to obtaining the user input, generate, at a first time, a first search-tree based on at least one of the first macro task, a state of the virtual environment at the first time, and a state of the virtual agent at the first time, wherein the first search-tree includes a first plurality of task nodes corresponding to potential tasks for performance by the virtual agent in furtherance of the first macro task;
determine physical motion plans (PMPs) for at least some of the first plurality of task nodes within the first search-tree in order to generate a first lookahead planning gradient for the first time, wherein a granularity of a PMP for a respective task node in the first search-tree is a function of the temporal distance of the respective task node from the first time; and
cause presentation of, via the display device, the virtual agent performing at least a portion of the PMPs within the virtual environment.

17. The device of claim 16, wherein a subset of the first plurality of task nodes correspond to immediate tasks for performance by the virtual agent at the first time, and wherein the one or more programs further cause the device to:
in response to detecting selection of a first immediate task associated with a first task node among the subset of the first plurality of task nodes:
present the virtual agent performing the first immediate task based on the PMP associated with the first task node within the virtual environment; and
update the virtual environment based on performance of the first immediate task by the virtual agent.

18. The device of claim 17, wherein the one or more programs further cause the device to:
update, at a second time, the first search-tree based on at least one of the first immediate task selected by the virtual agent, the first macro task, a state of the virtual environment at the second time, and a state of the virtual agent at the second time, wherein the updated first search-tree includes a second plurality of task nodes corresponding to potential tasks for performance by the virtual agent at the second time in furtherance of the first macro task, and wherein a subset of the second plurality of task nodes correspond to immediate tasks relative to the second time; and
determine PMPs for at least some of the second plurality of task nodes within the updated first search-tree in order to generate a second lookahead planning gradient for the second time, wherein the granularity of the physical motion planning for a respective node in the updated first search-tree is a function of the temporal distance of the respective node from the second time.

19. The device of claim 16, wherein the one or more programs further cause the device to:
obtain a second macro task for the virtual agent within the virtual environment;
generate, at the first time, a second search-tree based on at least one of the second macro task, a state of the virtual environment at the first time, and a state of the virtual agent at the first time, wherein the second search-tree includes a third plurality of task nodes corresponding to potential tasks for performance by the virtual agent at the first time in furtherance of the second macro task, and wherein a subset of the third plurality of task nodes correspond to immediate tasks relative to the first time; and
perform a PMP for at least some of the third plurality of task nodes within the second search-tree in order to generate a third lookahead planning gradient for the first time, wherein the granularity of the PMP for a respective task node in the second search-tree is a function of the temporal distance of the respective task node from the first time.

20. A non-transitory memory storing one or more programs, which, when executed by one or more processors of a device with an interface for communicating with a display device and one or more input devices, cause the device to:
obtain, via the one or more input devices, a user input that corresponds to a first macro task for a virtual agent within a virtual environment;
in response to obtaining the user input, generate, at a first time, a first search-tree based on at least one of the first macro task, a state of the virtual environment at the first time, and a state of the virtual agent at the first time, wherein the first search-tree includes a first plurality of task nodes corresponding to potential tasks for performance by the virtual agent in furtherance of the first macro task;
determine physical motion plans (PMPs) for at least some of the first plurality of task nodes within the first search-tree in order to generate a first lookahead planning gradient for the first time, wherein a granularity of a PMP for a respective task node in the first search-tree is a function of the temporal distance of the respective task node from the first time; and
cause presentation of, via the display device, the virtual agent performing at least a portion of the PMPs within the virtual environment.

21. The non-transitory memory of claim 20, wherein a subset of the first plurality of task nodes correspond to immediate tasks for performance by the virtual agent at the first time, and wherein the one or more programs further cause the device to:
in response to detecting selection of a first immediate task associated with a first task node among the subset of the first plurality of task nodes:
present the virtual agent performing the first immediate task based on the PMP associated with the first task node within the virtual environment; and
update the virtual environment based on performance of the first immediate task by the virtual agent.

22. The non-transitory memory of claim 21, wherein the one or more programs further cause the device to:
update, at a second time, the first search-tree based on at least one of the first immediate task selected by the virtual agent, the first macro task, a state of the virtual environment at the second time, and a state of the virtual agent at the second time, wherein the updated first search-tree includes a second plurality of task nodes corresponding to potential tasks for performance by the virtual agent at the second time in furtherance of the first macro task, and wherein a subset of the second plurality of task nodes correspond to immediate tasks relative to the second time; and
determine PMPs for at least some of the second plurality of task nodes within the updated first search-tree in order to generate a second lookahead planning gradient for the second time, wherein the granularity of the physical motion planning for a respective node in the updated first search-tree is a function of the temporal distance of the respective node from the second time.

23. The non-transitory memory of claim 20, wherein the one or more programs further cause the device to:
obtain a second macro task for the virtual agent within the virtual environment;
generate, at the first time, a second search-tree based on at least one of the second macro task, a state of the virtual environment at the first time, and a state of the virtual agent at the first time, wherein the second search-tree includes a third plurality of task nodes corresponding to potential tasks for performance by the virtual agent at the first time in furtherance of the second macro task, and wherein a subset of the third plurality of task nodes correspond to immediate tasks relative to the first time; and
perform a PMP for at least some of the third plurality of task nodes within the second search-tree in order to generate a third lookahead planning gradient for the first time, wherein the granularity of the PMP for a respective task node in the second search-tree is a function of the temporal distance of the respective task node from the first time.

* * * * *